US009628276B2

(12) United States Patent
Simon et al.

(10) Patent No.: US 9,628,276 B2
(45) Date of Patent: *Apr. 18, 2017

(54) DISCOVERY OF SECURE NETWORK ENCLAVES

(71) Applicant: Microsoft Corporation, Redmond, WA (US)

(72) Inventors: Daniel R. Simon, Mercer Island, WA (US); Brian D. Swander, Bellevue, WA (US); Pascal Menezes, Bellevue, WA (US); Gabriel E. Montenegro, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1101 days.

This patent is subject to a terminal disclaimer.

(21) Appl. No.: 13/708,932

(22) Filed: Dec. 8, 2012

(65) Prior Publication Data

US 2013/0097424 A1 Apr. 18, 2013

Related U.S. Application Data

(63) Continuation of application No. 12/483,052, filed on Jun. 11, 2009, now Pat. No. 8,352,741.

(51) Int. Cl.
*H04L 9/32* (2006.01)
*H04L 9/08* (2006.01)
*H04L 29/06* (2006.01)

(52) U.S. Cl.
CPC .............. *H04L 9/32* (2013.01); *H04L 9/0836* (2013.01); *H04L 9/0861* (2013.01); *H04L 63/064* (2013.01); *H04L 2463/061* (2013.01)

(58) Field of Classification Search
CPC ........................................ H04L 9/32

USPC ........................................................ 713/171
See application file for complete search history.

(56) References Cited

U.S. PATENT DOCUMENTS 4,771,459 A  9/1988 Jansen
4,941,176 A  7/1990 Matyas et al.
(Continued)

FOREIGN PATENT DOCUMENTS

CN   1642163 A   7/2005
CN   1802872 A   7/2006
(Continued)

OTHER PUBLICATIONS

Jospeh Davies, "The Cable Guy: The Authenticated Internet Protocol," Dec. 20, 2008.*
(Continued)

*Primary Examiner* — Andrew Georgandellis
(74) *Attorney, Agent, or Firm* — Davin Chin; Chin IP, PLLC

(57) ABSTRACT

A hierarchical key generation and distribution mechanism for a computer system in which devices are organized into secure enclaves. The mechanism enables network access to be tailored to approximate minimum needed privileges for each device. At the lowest level of the hierarchy, keys are used to form security associations between devices. Keys at each level of the hierarchy are generated from keys at a higher level of the hierarchy and key derivation information. Key derivation information is readily ascertainable, either from identifiers for devices or from within messages, supporting hardware offload of cryptographic functions. Because keys may be generated based on the enclaves in which the hosts participating in a security association are located, the system includes a mechanism by which devices can discover the enclave in which they are located.

20 Claims, 12 Drawing Sheets

(56) References Cited

U.S. PATENT DOCUMENTS

| | | |
|---|---|---|
| 6,628,617 B1 | 9/2003 | Karol et al. |
| 7,246,232 B2 | 7/2007 | Dutertre |
| 7,290,132 B2 | 10/2007 | Aboba et al. |
| 7,299,246 B1 | 11/2007 | Eatough |
| 7,499,547 B2 | 3/2009 | Zheng et al. |
| 8,352,741 B2 | 1/2013 | Simon et al. |
| 2002/0029280 A1 | 3/2002 | Holden et al. |
| 2005/0094568 A1 | 5/2005 | Judd |
| 2006/0198517 A1 | 9/2006 | Cameron et al. |
| 2007/0136572 A1 | 6/2007 | Chen et al. |
| 2007/0160201 A1* | 7/2007 | Blom ............... H04L 9/0844 380/30 |
| 2007/0263658 A1 | 11/2007 | Ung et al. |
| 2008/0005798 A1 | 1/2008 | Ross |
| 2008/0016338 A1 | 1/2008 | Sun |
| 2008/0022391 A1 | 1/2008 | Sax et al. |
| 2008/0065890 A1 | 3/2008 | Lundsgaard |
| 2008/0077994 A1 | 3/2008 | Comlekoglu |
| 2008/0095362 A1 | 4/2008 | Blom et al. |
| 2009/0225986 A1 | 9/2009 | Gennaro et al. |
| 2010/0034207 A1* | 2/2010 | Mcgrew ............... H04L 45/50 370/401 |
| 2010/0318800 A1 | 12/2010 | Simon et al. |

FOREIGN PATENT DOCUMENTS

| | | |
|---|---|---|
| CN | 1859086 A | 11/2006 |
| EP | 0737907 A | 10/1996 |
| EP | 1162807 A | 12/2001 |
| TW | I307593 | 3/2009 |
| WO | 2006054927 A | 5/2006 |

OTHER PUBLICATIONS

"First Office Action and Search Report Received for Chinese Patent Application No. 201080025719.0", Mailed Date: Jul. 3, 2014, 13 Pages.

Chinese Office Action dated Nov. 5, 2013 from CN Application 201080025723.7, 7 pages including Concise Statement of Relevance/summary.

Final Office Action dated Feb. 3, 2012 in U.S. Appl. No. 12/483,095, 15 pages.

Final Office Action dated Oct. 27, 2014 in U.S. Appl. No. 12/483,095, 9 pages.

International Search Report and Written Opinion from PCT Application PCT/US2010/037305 dated Dec. 27, 2010, 9 pages.

Non-Final Office Action dated Sep. 12, 2011 in U.S. Appl. No. 12/483,095, 14 pages.

"Office Action and Search Report Issued in Taiwan Patent Application No. 99114865", Mailed Date: Nov. 27, 2014, 5 Pages.

"Internet Key Exchange (IKEv2) Protocol."; http://tools.ietf.org/html/rfc4306.

"Tracing IPv6 Routes.".

Aurisch et al., "Automatic multicast Ipsec by using a proactive Ipsec discovery protocol and a group key management," J. Telecomm Info Tech Feb. 2008, pp. 77-83, http://www.nit.eu/czasopisma/JTIT/2008/2/77.pdf, Mar. 12, 2009.

International Search Report and Written Opinion from PCT Application PCT/US2010/037652 dated Dec. 29, 2010.

Mah, F., "Group Key Management in Multicast Security," Helsinki University of Technology, http://www.tml.tkk.fi/Publications/C/18/mah.pdf, pp. 1-7, Mar. 12, 2009.

Mishra, S., "Intrusion Tolerant Key Management for Large Group Multicast," Department of Computer Science, University of Colorado, Boulder, CO, http://www.cs.colorado.edu/.about.mishras/research/papers/dsn03fa.pdf, pp. 1-2, Mar. 12, 2009.

Non-Final Office Action dated Jan. 20, 2016 in U.S. Appl. No. 12/483,095, 10 pages.

Final Office Action dated Jun. 24, 2016 in U.S. Appl. No. 12/483,095, 9 pages.

Non-Final Office Action dated Dec. 22, 2016 in U.S. Appl. No. 12/483,095, 8 pages.

* cited by examiner

DISCOVERY OF SECURE NETWORK ENCLAVES

CROSS-REFERENCE TO RELATED APPLICATION(S)

This application is a continuation application of U.S. patent application Ser. No. 12/483,052, filed on Jun. 11, 2009. The afore-referenced application is hereby incorporated by reference.

BACKGROUND

Security has become increasingly important for computer systems. Enterprises maintain many types of information, such as financial information, confidential business information or personal information concerning customers and employees. For many important business reasons, this information is generally available, at least to some individuals, through an enterprises computer system. However, this information, if accessed and misused by unauthorized parties, can cause significant harm to an enterprise, its employees or customers.

To protect information in an enterprise computing system, many security techniques have been proposed. One such approach is a secure network communication protocol called IPsec. In IPsec, two host devices that are to communicate form a "security association." The security association is based one or more keys that are exchanged between the hosts using a key exchange protocol. The two hosts can then use the keys to encrypt or authenticate messages passed between them, depending on the level of security desired.

A drawback of using IPsec in a networked setting is that the cryptographic processing needed to encrypt and decrypt or sign and authenticate messages can undesirably load the central processor of a host device. To reduce processor load, network interface chipsets have been developed to offload these cryptographic functions. Such chipsets can store keys for each active security association for which a computer containing the network interface is a host. As information is passed to the network interface for communication using a particular security association, the chipset can encrypt or sign the information using the appropriate keys. Likewise, as a packet associated with a security association is received, the chipset can authenticate or decrypt information in the packet and pass the results of such processing to a network stack for further processing.

While such processing can be useful in some scenarios, existing chipsets are limited in the number of active security associations they can simultaneously maintain. For example, a server in a large enterprise may maintain on the order of 10,000 security associations, but a chipset may be capable of maintaining information to support only on the order of 1,000 security associations.

To expand the number of security associations that can be supported by a chipset for a network interface, it has been proposed to form network "enclaves." According to this proposal, each enclave may have its own key that is used to generate, in a predictable manner, keys for security associations involving devices in the enclave. The enclave key is used to generate, in a predictable manner, keys for servers within the enclave. From these keys, the servers can then generate keys for security associations as they are formed. When a device sends packets signed or encrypted using a security association key, the device appends information to the packet identifying how the key was derived. Other devices that access the packet can generate, on the fly, the appropriate keys for cryptographic processing of the packet. Because the security association key for any of a number of security associations can be generated from the enclave key, a chipset has access to a large number of security associations, without requiring large amounts of storage. This approach for automatic key generation may be used by devices that are hosts of the security association or intermediary devices that process packets as they pass between hosts, so long as the intermediary device has access to the appropriate enclave key.

SUMMARY

To implement secure network enclaves, it is desirable to allow devices, acting as hosts for a connection, to identify enclaves associated with host devices. Intermediary devices in the network paths between host devices can be used to aid one or more of the host devices identify either their own enclave or the enclave of another host device. Intermediaries may make this identification by inserting information into packets exchanged between host devices.

In one aspect, the invention relates to a method of operating a computer system to provide secure communications. The computer system comprises a plurality of host devices interconnected by a network and organized into enclaves. According to the method, at a host device, a packet is received over the network. The host device analyzes the packet to identify a chain of one or more markers in the packet, each marker indicating an enclave. The host can then determining an enclave in which the host device is located based on the chain of one or more markers.

In another aspect, the invention relates to a method of operating a computer system to provide secure communications. The computer system comprising a plurality of host devices interconnected by a network and organized into enclaves. The method comprises at an intermediary device configured in a network enclave, receiving a packet over the network. In the intermediary device, the packet is analyzed to determine whether the packet contains a value requesting that intermediary devices place markers in packets addressed to the host. When the packet contains the value requesting that intermediary devices place markers in packets addressed to the host, the intermediary appends a marker indicating an enclave to a field in at least one packet addressed to the host. The indicated enclave could be that of the intermediary or a host.

In another aspect, the invention relates to a method of operating a computer system to provide secure communications. The computer system comprises a plurality of host devices interconnected by a network and organized into enclaves. As part of the method, from a first host device, a first packet is sent to a second device. At one or more intermediary devices coupled in a network path between the first host and the second host, the first packet is detected and an indication of the first host is recorded. From the second host, a second packet is sent to the first host. At each of the one or more intermediary devices, the second packet is identified based on the recorded indication of the first host and an indicator of the enclave of the intermediary device is added to the second packet. At the first host, an enclave of the first host is determined based on an indicator added by an intermediary of the one or more intermediary devices.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
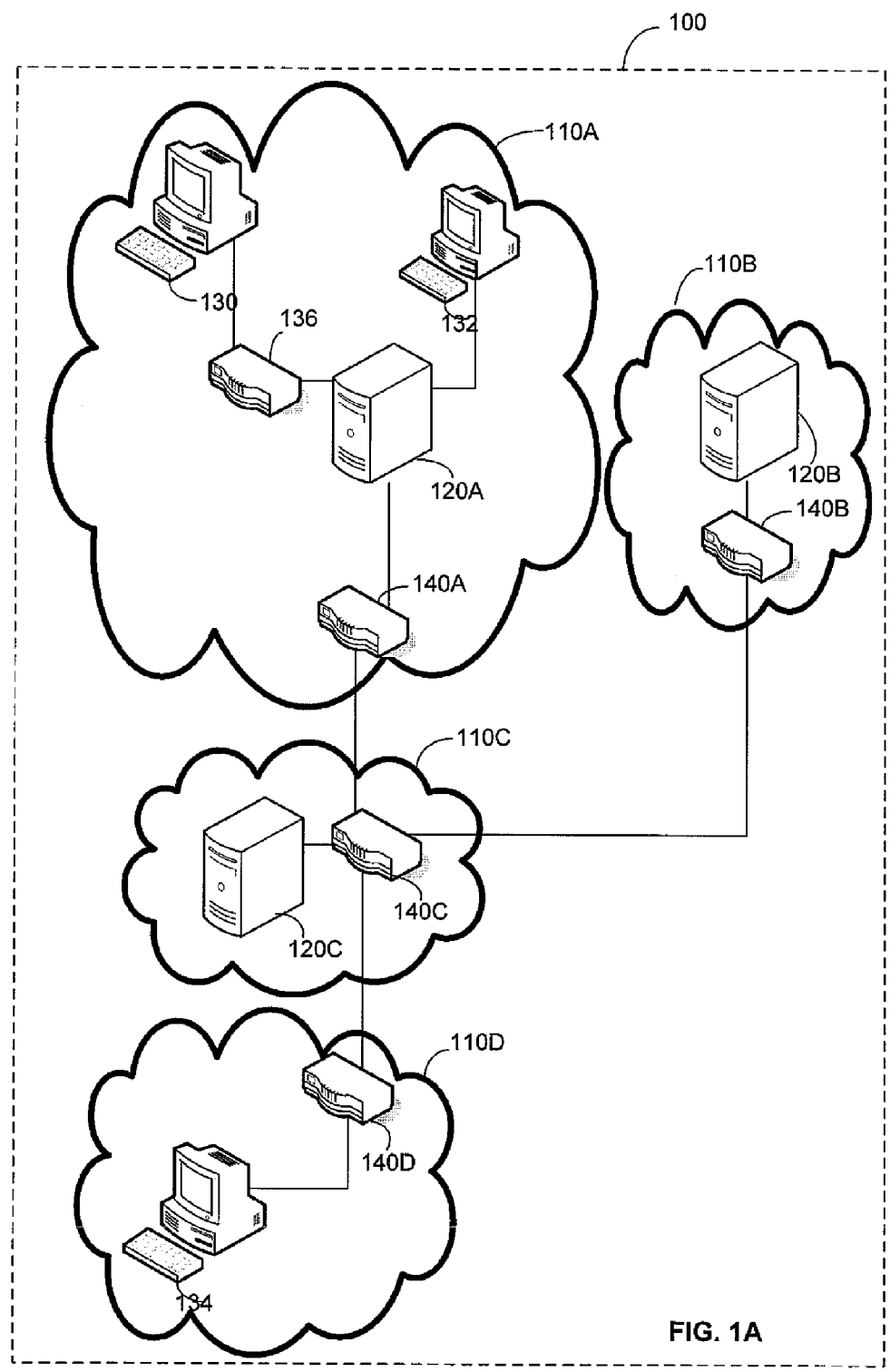
FIG. 1A is a sketch of an enterprise computing system containing multiple secure enclaves.

The inventors have recognized and appreciated that secure enclaves, and hardware off load of cryptographic functions to support secure enclaves, could be improved through improved methods of key management. The keys may be generated and distributed to allow easy network access. Yet, the key management system should enable restricting the access each device receives. A hierarchical key management approach may be used to support generation of keys that provide different levels of access for communication between different groups of devices. A hierarchical key management approach also enables a simple mechanism for key distribution throughout an enterprise computer system, such that devices within secure enclaves can appropriately process network traffic.

In some embodiments, an overall organization key forms the top level of the key hierarchy. From this organization key, pair-wise enclave keys are generated for each pair of enclaves (including each enclave paired with itself as a pair) in a networked computer system operated by the organization. Each pair-wise enclave key may be used in generating keys at the next lower level of the hierarchy.

In exemplary embodiments described herein, host devices at opposite ends of a security association may be termed "a server" and a "client." The server generates security association keys for each security association formed with a client. To generate the security association keys, the server may have a server key, which can be derived from the pair-wise key for its enclave and the enclave in which the client is located.

In the described embodiment, the keys, at whatever level of the hierarchy, are treated as secure information. Key derivation information, used to generate keys at lower levels of the hierarchy from a key at a higher level of the hierarchy, need not be treated as secure information. The key derivation information can be communicated in an unsecure or relatively unsecure fashion in messages sent over the network. As a result, many network devices have access to the key derivation information. Devices that have access to keys in the hierarchy, at any level, that were used to generate a particular security association key, therefore can get access to the key derivation information and generate a security association key.

To reduce the number of security association keys that must be retained by each device, higher level keys and key derivation information may be used to dynamically generate keys at lower levels in the hierarchy. For example, a server within an enclave may be provisioned with all pair-wise server keys for which that enclave is one enclave in the associated pair. A specific security association key may be generated from one of these keys when the enclave of a client with which a security association is to be formed is identified.

The key provisioning may also occur dynamically. For example, a device may download keys from a key server. Dynamic provisioning may occur in real time, in response to a requirement to use the key to perform a cryptographic function on a packet. Alternatively, some or all of the keys may be provisioned in advance of when needed. When provisioned in advance of use, the keys may be re-provisioned or re-generated from time to time. The re-provisioning may be performed periodically, such as daily, or may be performed in response to events, such as a device entering or leaving an enclave.

Regardless of when the keys are provisioned, keys may be distributed throughout an organization starting with a top level organization key. Suitable security measures, whether now known in the art or hereafter developed, may be used to limit distribution of keys at different levels of the hierarchy to only those devices that are authorized to access information encrypted with keys directly or indirectly derived from the key.

Authorized devices may be determined any suitable way. In some embodiments, a network administrator may establish authorized devices by creating access control lists, provisioning certain devices with certificates or other tokens of authorization. In some embodiments, authorized devices may be established using security systems already in place in an enterprise computer system. For example, many enterprise computer systems utilize the Active Directory™ network management system to authenticate devices. Such a system may be used to control which devices get access to which keys and to provide secure mechanisms of communicating keys to those devices.

Regardless of how distribution of keys is restricted, by appropriately restricting distribution of keys at different levels of the hierarchy, the level of access may be set so that each device has only the level of access needed. For example, some devices may have access to only packets between a particular sever and a particular client. Other devices may have access to communications between a particular server and any device in any enclave. Yet other devices may have access to packets communicated between any device within one enclave and any device in any enclave. Yet other devices may be given access to any packets sent through the computer system.

However, it should be appreciated that not all levels of the hierarchy need to be present in all embodiments. For example, in some embodiments, rather than provide a single top level organization key, an enclave key may initially be provided for each enclave from which pair-wise enclave keys may be generated. Alternatively, pair-wise enclave keys may be provisioned to devices directly by an administrator. As another example, though server keys are described, servers may be provided access to pair-wise enclave keys, which can be used to generate security association keys directly without an intermediate step of generating server keys. Likewise, additional levels of hierarchical keys may be employed in some embodiments. A computer system, for example, may be divided into any number of levels of sub-enclaves, with each sub-enclave having its own key and pair-wise keys with other sub-enclaves.

One use of a hierarchical key management approach is to allow intermediary devices to access enclave keys needed to generate security association keys in real time. An intermediary device that is positioned in a network between two enclaves may be authorized to monitor network traffic between those two enclaves by providing the intermediate device with the pair-wise enclave key associated with those enclaves.

An intermediate device may be provisioned to access such messages for any of a number of reasons. For example, the intermediary device may execute anti-malware software that, once access to the content of messages is provided, ensures that the messages are not infected with viruses. Intermediary devices may perform any other suitable monitoring functions based on message content. Intermediary devices may also perform other functions, such as manipulating messages, or taking control actions as described herein.

Regardless of the specific function of an intermediate device, it may capture key derivation information in messages sent over the network. The key derivation information, in combination with keys provisioned to the intermediary device, can then be used to derive keys for security associations for network traffic passing through the intermediary device.

Hierarchical keys also facilitate hardware offload of the cryptographic processing for network packets to support these functions. Network interface hardware, whether in a host in a security association or in an intermediary device that monitors network traffic sent using a security association, may dynamically generate security association keys as part of off-load processing. As a result, even for devices given relatively high-level access, the number of keys that must be maintained in hardware is manageable.

However, in some scenarios, a computer system may include intermediary devices that support such key derivation and some that do not. The key management system may provide a mechanism for an intermediary device to obtain the information it needs to access security association keys when it cannot generate the keys based on information available to it. For example, a direct key exchange may be performed. The intermediary device may signal the host acting as the server that it does not support secure enclaves, which may trigger the server to enter into a direct key exchange with the intermediary device. A similar key exchange may be performed if either of the hosts participating in the security association does not support including key derivation information in packets sent under a security association.

As noted above, key management is based on devices being associated with an enclave. In some embodiments, enclaves are static and defined in advance. In such embodiments, devices may be assigned to enclaves based on network topography or other factors. Devices can then be provisioned with an indication of the enclave to which they belong.

However, in other instances, networks may be reconfigured or may support mobile devices. In these embodiments, it may not be possible to assign specific devices to enclaves in advance. Also, in some instances, it may be difficult or burdensome to assign all devices to enclaves. Accordingly, in some embodiments, a key management system may include an enclave discovery protocol that allows a device to discover its enclave.

Any suitable enclave discovery protocol may be used. As one example, a subset of the network devices may be assigned to enclaves and may communicate their enclave status to other devices so that the other devices can infer their own enclave membership based on connections to the devices that have been assigned to enclaves.

In some embodiments, devices likely to be intermediaries involved in routing packets between other network devices may be assigned to enclaves. The subset of such devices may be small enough and the locations of these devices may change infrequently enough that relatively little burden is required to provision each such device with an indication of an enclave in which the device is located.

As packets pass between two hosts forming a security association, each such intermediary device may add a marker to the packet, indicating an enclave. A host receiving such a packet may use the marker to determine its own enclave. In some embodiments, the marker may indicate the enclave of either or both hosts. Such information could be obtained by an intermediary device, for example, from a database accessible to the intermediary device containing enclave assignments of hosts in the system.

In other embodiments, the marker may contain information that allows a host to infer its enclave. For example, each intermediary device may append information identifying its own enclave. The intermediary devices may add markers in turn, creating an ordered chain of markers. Any host receiving such a packet may analyze the chain of markers to determine the enclaves at the beginning and the end of the chain, which may indicate the enclaves of the hosts forming the security association.

From this information, the host can determine its own enclave. A single packet may be adequate for a host to determine its own enclave, though in some instances, variability of packet routing within a network may produce different chains of markers in different packets communicated between the same two hosts. If there are inconsistencies, a device may obtain information from multiple packets and identify its own enclave based on the most frequently indicated enclave or using any suitable approach for resolving the ambiguity.

A chain of enclave markers similarly can be used by a server to determine the enclave in which a client is located. This information, for example, may be used in selecting an appropriate pair-wise key to generate a server key that in turn will be used to generate a security association key.

Any suitable devices may place markers identifying enclaves on packets. In some embodiments, intermediary devices, such as routers and gateways, may be configured to place such markers, although any suitable devices may be used to place enclave markers.

A key management system according to embodiments of the invention may be employed in any suitable computer system. As an example, a key management system may be incorporated in enterprise computer system 100 (FIG. 1A), such as may be found in a large company. Computer system 100 contains multiple computer devices shown divided into enclaves 110A, 110B, 110C and 110D. The network devices may be grouped into enclaves in any suitable way. In the embodiment illustrated, the enclaves are formed generally based on network topology such that devices that may be accessed through a router or other gateway device are generally grouped in the same enclave. However, any suitable criteria for dividing devices into enclaves may be used.

FIG. 1A is a simplified illustration of a computer system. Here, three types of devices are shown: servers, clients and multiport devices. Servers, such as servers 120A, 120B and 120C, are illustrated. Servers may be computing devices with relatively large amounts of computer resources, such as processing power or computer storage media. These devices may be relatively fixed, being mounted in racks or other stationary structures. Such devices may act as file servers, print servers, database servers, web servers or perform other functions within an enterprise. However, a server may be any computing device that supplies information to another device. Accordingly, the invention is not limited by the nature of processing capabilities of a server. Desktop computers, laptop computers and even small electronic devices may sometimes act as servers.

FIG. 1A also illustrates that there are multiple client devices within computer system 100. For simplicity, three client devices, client devices 130, 132 and 134, are illustrated. In this example, client devices are illustrated as desktop computers. However, a client device may be any device that receives information from a server. Thus, in addition to desktop computers, a client device could be a laptop computer or other portable computing device. A device with a relatively large amount of processing resources could also be a client, depending on the specific operation being performed by the device.

In addition to servers and clients, computer system 100 may include one or more multiport devices, such as multiport device 136. Generally, multiport devices within a network perform routing, switching or other traffic-processing functions that facilitate packets addressed to particular devices reaching their intended destination. Examples of multiport devices include routers and switches, as well as load balancers, WAN optimizers and intrusion detection/prevention systems.

In addition to multiport device 136, computer system 100 is shown to contain multiport devices that act as intermediary devices between enclaves. In FIG. 1A, intermediary devices 140A, 140B, 140C and 140D are shown. Each of these intermediary devices may act as a gateway through which messages to or from devices within an enclave may pass. For example, intermediary device 140A may act as a gateway to the devices within an enclave 110A. Intermediary device 140B may act as a gateway through which messages to and from devices within an enclave 110B may pass. Similarly, intermediary device 140C may act as a gateway for devices within an enclave 110C and intermediary device 140D may act as a gateway for devices in enclave 110D.

However, it is not a requirement that an intermediary device be a gateway to an enclave. Intermediary devices may be connected in the network in a way that they may forward messages from one enclave to another. For example, intermediary device 140C may receive messages generated in any of the enclaves 110A, 110B, 110C or 110D and route the message to any of the other enclaves, based on a destination address in the message.

It should be appreciated that FIG. 1A is a simplified sketch of just one possible implementation of an enterprise computer system in which the invention may be employed. Only four enclaves are illustrated in FIG. 1A for simplicity. Any suitable number of enclaves may be present and many more than four enclaves may be present in a computer system in a large enterprise.

Regardless of the number of enclaves, enclaves may be defined in any suitable way. In some embodiments, enclaves may be defined by a network administrator. The enclaves may be defined based on network topology, such that each enclave is separated from other enclaves by at least one intermediary device. Additionally, enclaves may be defined such that only devices under common administrative control are grouped into the same enclave. In this way, devices for which similar access controls may be applicable may be in the same enclave such that devices in the enclave may share enclave keys without comprising security of information.

Figure 1B:
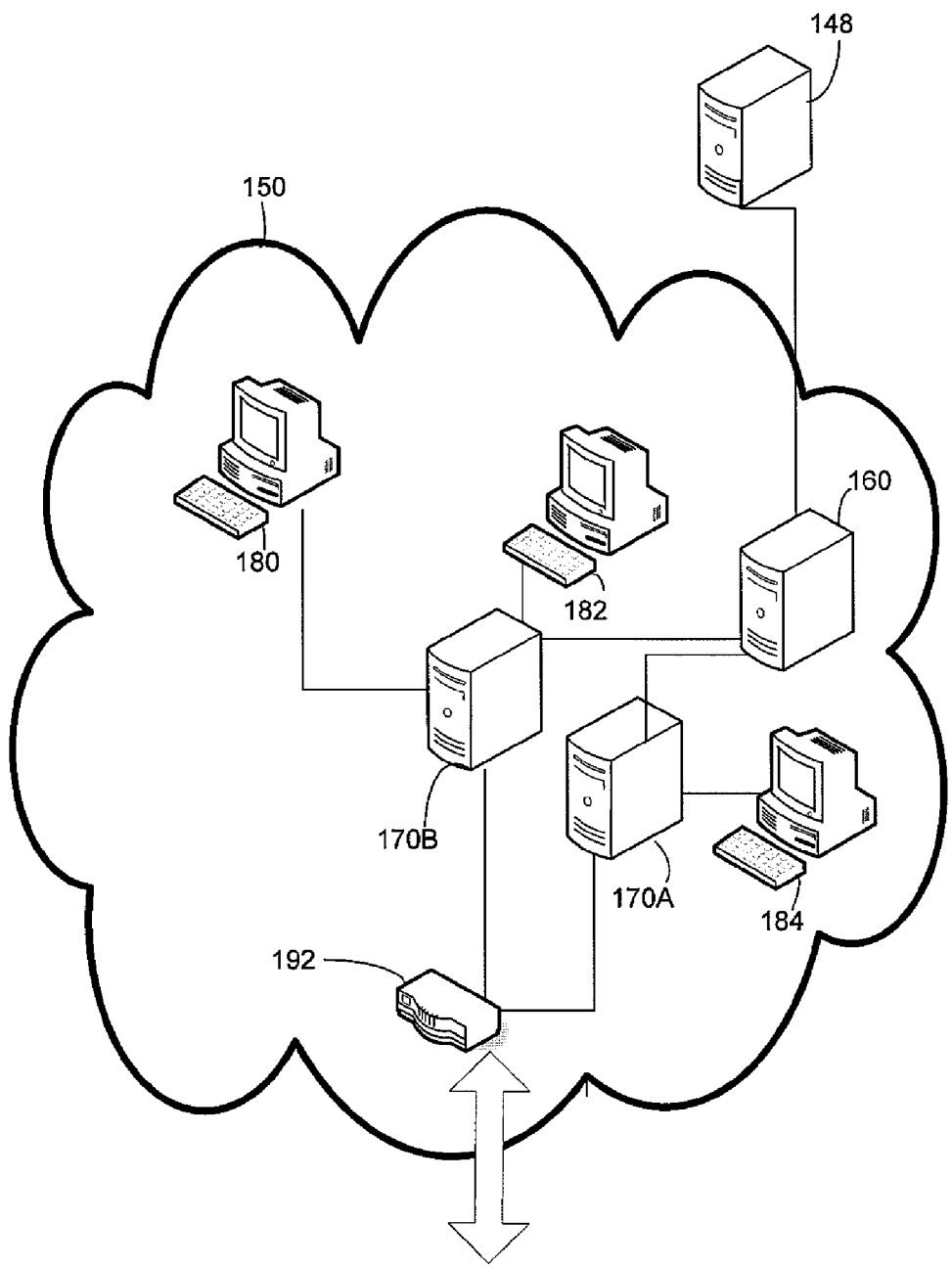
FIG. 1B is an expanded view of a secure enclave that may form a portion of an enterprise computing system according to some embodiments of the invention.

FIG. 1A illustrates that enclaves may be formed with different numbers and types of devices in each enclave. To support a hierarchical key generation and distribution system, certain devices within an enclave may have specific functions associated with key generation or distribution. FIG. 1B shows an enlarged view of an enclave. FIG. 1B illustrates that an enclave may have associated with it servers that perform specific functions associated with hierarchical key generation and distribution.

As shown in FIG. 1B, enclave 150 includes servers, such as servers 170A and 170B. In operation, servers 170A and 170B may form security associations with client devices, both within enclave 150 and within other enclaves to which enclave 150 may be coupled through a network. In FIG. 1B, client devices 180, 182 and 184 are illustrated within enclave 150 and servers 170A and 170B may form security associations with these client devices. Though client devices in other enclaves are not expressly illustrated in FIG. 1B, servers 170A and 170B may also communicate with client devices in other enclaves through intermediary device 192.

Communications between servers and clients may be secured using one or more cryptographic techniques. Such cryptographic techniques may be used to encrypt or provide a mechanism to authenticate information. Regardless of the purpose for including cryptographic techniques, cryptographic functions may be performed using security parameters, such as a cryptographic key, as is known in the art. When used for encryption, the cryptographic key is combined, in accordance with a cryptographic function, with information to be encrypted. The original information can be recovered from the encrypted information by parties having the cryptographic key, but the complexity of the cryptographic function makes it impossible as a practical matter to ascertain the original information from the encrypted information without the key. In contrast, authentication may involve a cryptographic function in which information, along with the key, is combined to generate a signature. In this case, the cryptographic function is so complex that a signature cannot be generated as a practical matter without the cryptographic key. To authenticate information that has been communicated over a network, the cryptographic function may be performed again on the information as received and compared with the signature associated with the information when transmitted. If the information has been changed, the generated signatures will not match, allowing information that has been altered to be readily identified.

In the examples described herein, cryptographic functions relating to encryption are described. However, it is not a requirement of the invention that the keys distributed throughout a computer system be used for encryption. A key may alternatively or additionally be used for authentication. In some embodiments, separate keys may be provided for encryption and authentication. Accordingly, while the examples described herein discuss a single key for each security association formed between two devices, there may be any number of keys that form a part of each security association. For example, an encryption key and an authentication key may be generated. Each such key may be generated and distributed according to the techniques described herein. Moreover, cryptographic keys may be employed as part of cryptographic functions for reasons other than encryption or authentication of data. Accordingly, it should be appreciated that the invention is not limited to any number or type of keys or cryptographic functions performed with those keys.

Regardless of the number and use of the cryptographic keys, each server in enclave 150 may form security associations with one or more client devices. Each security association is created by sharing security parameters between each of the host devices of the security association, including the cryptographic key or keys. The security parameters are used to perform cryptographic functions on information conveyed using the security association. The information may be passed as packets across a network. As one example, the packets may contain information that is encrypted using the security parameters generated for the security association.

The security parameters may include any information that prevents unauthorized parties from accessing the information. In the examples provided herein, a session key, sometimes called a security association key, is used as an example of a security parameter. The security association key is used to encrypt information sent from one host of the security association to the other. For simplicity, in the examples herein, the same security association key is used to encrypt information passing in either direction between the hosts. However, it should be appreciated that the security parameters may include multiple keys used for sending and receiving information at each host.

Security parameters may be shared between two hosts in any suitable manner, including using techniques as are known in the art. As one example, an IPsec communication protocol has been developed to allow secure communication. IPsec supports encryption and/or authentication of packets passed between hosts. In addition to defining a format of packets protected using security information, IPsec includes a protocol for initial interactions between hosts by which the hosts may obtain a common set of security parameters to be used as part of the security association. Examples of such protocols are the internet key exchange protocol (IKE) and the AuthIP protocol. According to these protocols, a server may generate a security association key and send it to the client. Subsequently, the client and server may use this key for encrypting messages passed between them.

In an example embodiment, a security association key is at the lowest level of the key hierarchy. As each of the servers, such as servers 170A and 170B, forms new security associations, the server generates a security association key. Each of the servers generates security association keys from a server key. Here, each server, such as server 170A and 170B, may contain a set of server keys. The server keys may be pair-wise keys such that each of the server keys may be associated with a different pair of enclaves. Accordingly, when a server generates a security association key, it first determines the enclave in which the client is located and selects an appropriate server key for the enclave pair that includes the client enclave and the server's own enclave.

Each server may receive its server keys from an enclave key server 160. Enclave key server 160 may be configured to generate server keys for each server within enclave 150 that is authorized to receive such server keys. Enclave key server 160 may use any suitable mechanism to identify authorized servers and to communicate keys to those authorized servers. For example, the IPsec protocol may be used to securely communicate keys from enclave key server 160 to servers such as 170A and 170B once servers 170A and 170B authenticate themselves.

In the embodiment illustrated, enclave key server 160 generates keys for servers, such as servers 170A and 170B, from a set of pair-wise enclave keys. In the embodiment illustrated, enclave key server 160 may generate pair-wise enclave keys based on information received from an organization key server 148, which may hold an organization key. Organization key server 148 may similarly provide pair-wise enclave keys to enclave key servers in other enclaves.

Figure 2A:
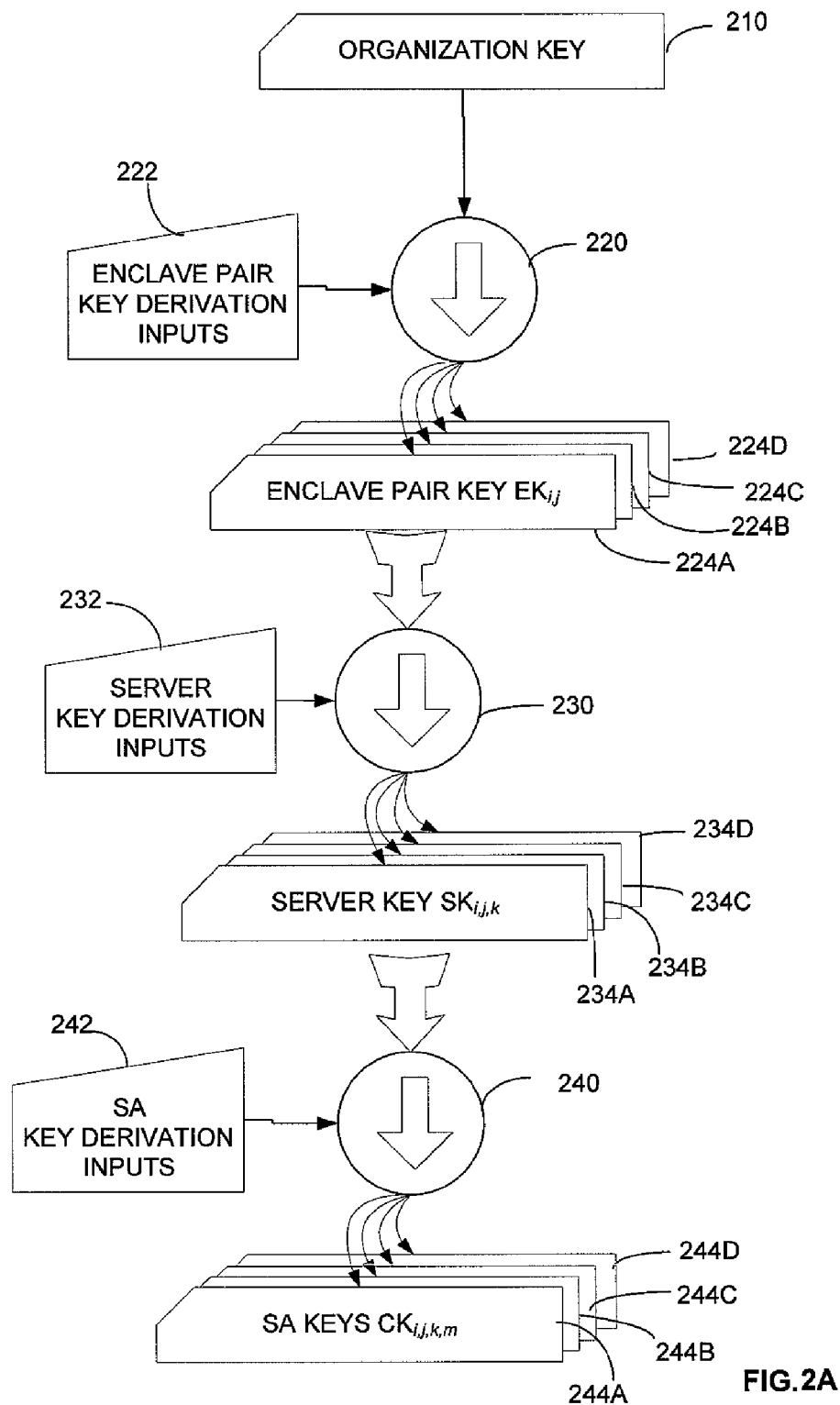
FIG. 2A is a schematic illustration of hierarchical key generation according to some embodiments of the invention.

FIG. 2A illustrates in schematic form the hierarchical generation of keys. In this example, the top level of the hierarchy is organization key 220. Organization key 210 may be stored in organization key server 148 (FIG. 1A), or it may be provisioned in any device intended to have access to all levels of information in a computer system using the key hierarchy illustrated in FIG. 2B. Regardless of which devices receive the organization key, organization key 210 may be provisioned to these devices in any suitable way. It may, for example, be provisioned by a network administrator or generated within the devices in any suitable way.

Regardless of how organization key 210 is provisioned, it may be used to generate multiple enclave pair-wise keys, of which pair-wise keys 224A, 224B, 224C and 224D are illustrated. In the embodiment illustrated in FIG. 2A, each of the enclave pair-wise keys is generated based on a pseudo-random function 220 performed on organization key 210 in combination with enclave pair derivation inputs 222. This function may be performed within organization key server 148 (FIG. 1B). In this way, organization key 210 may be maintained in a secure environment within organization key server 148 or in any other device that is to be given the highest level of network access even though it is, at least indirectly, used to generate keys at all levels of the hierarchy.

Cryptographic function 220 may be any suitable pseudo-random function. As is known in the art, a pseudorandom function is such that, as a practical matter, the function from the inputs to the output appears random, if the key used in its computation is sufficiently long and random (or pseudo-random). One implication of that property is that the key cannot be ascertained from the input-output pairs. Accordingly, though enclave pair-wise keys 224A, 224B, 224C and 224D computed as outputs of the function may be provided to devices outside organization key server 148, providing those keys does not jeopardize security of organization key 210.

Enclave key derivation inputs 222 may be any suitable information available to devices that generate enclave pair-wise keys from organization key 210. As one example, enclave pair key derivation inputs 222 may be identifiers for the enclaves. For example, if enclave 110A (FIG. 1A) is identified as enclave (1) and enclave 110B is identified as enclave (2), an enclave pair-wise key for communication between enclaves 110A and 110B may be generated using a pair of key derivation inputs (1, 2).

Using identifiers of the enclaves as the enclave pair-wise key derivation inputs 222 allows any device having access to organization key 210 to generate the same set of enclave pair-wise keys. For example, if intermediary device 140C (FIG. 1A) is to be given access to all message traffic within computer system 100, intermediary device 140C could be given access to organization key 210. In this way, intermediary device 140C could generate enclave pair-wise keys 224A . . . 224D in the same fashion as organization key server 148. The generated enclave pair-wise keys within intermediary device 140C could be used to, in turn, generate keys at lower levels of the key hierarchy. This sequential key generation can be used to generate keys at any level of the hierarchy, including the security association keys used to encrypt packets communicated between two hosts that are part of a security association.

In the embodiment illustrated, a pair-wise enclave key $EK_{i,j}$ may be generated for each unique pairing of enclaves. In this embodiment, the same pair-wise key is used for communications from a server in a first enclave to a client in a second enclave as from a server in the second enclave to a client in the first enclave. Accordingly, pair-wise key $EK_{i,j}$ is the same as pair-wise key $EK_{j,i}$. However, in some embodiments, different keys could be generated for each ordered pair of enclaves.

FIG. 2A illustrates that a full set of enclave pair-wise keys is generated. In some embodiments, pair-wise keys may be generated dynamically, such that pair-wise keys are only generated for pairs of enclaves having ongoing communications. Regardless of when and how many enclave pair-wise keys generated, pair-wise keys may be used to generate one or more server keys.

As shown, each server key is generated from a pair-wise enclave key using a pseudorandom cryptographic function 230. As with pseudorandom cryptographic function 220, pseudorandom cryptographic function 230 generates server keys from a key at a higher level in the hierarchy in a way that makes it is computationally impractical to distinguish the input-output pairs from those of a randomly generated function, and in particular to recover the higher level key that was used in the function to compute the server key output from the inputs. However, each server key is generated in a predictable fashion based on server key derivation inputs 232. As a result, any device that has access to an enclave pair-wise key, $EK_{i,j}$, can generate a key that a sever in enclave i will use to communicate with a client in enclave j or a server in enclave i will use to communicate with a server in enclave j, assuming the device has access to the server key derivation inputs. In embodiments illustrated, server key derivation inputs may simply be an identifier of the server for which a key is to be generated. Because such an identifier may be readily accessible to other devices, devices that have access to the enclave pair-wise key can recreate the server key. For example, in the example of FIG. 1A, intermediary device 140A, if it is to be configured to monitor network traffic leaving enclave 110A, may have access to enclave pair-wise keys $EK_{1,1}$ . . . $EK_{1,M}$, which would be sufficient to generate any server keys that may be used by devices within enclave 110A.

FIG. 2A illustrates that an enclave pair-wise key $EK_{i,j}$ is used to generate keys for communication between devices in enclaves i and j. When a server k in enclave i requires a key for use in communicating with clients in enclave j, the server key $SK_{i,j,k}$ is generated using an identifier of server k as a server key derivation input. Thus, multiple server keys, of which server keys 234A, 234B, 234C and 234D are illustrated, may be generated. In this example, these server keys may be for different servers, though each server may have multiple server keys, depending on the locations of client devices with which it communicates. As with other keys, the server keys may be generated in advance or may be generated dynamically as communication between devices creates the need for a further server key.

From the server keys, individual security association keys, such as keys 244A, 244B, 244C and 244D, may be generated. As with other keys, the security association keys may be generated using a one-way cryptographic function taking as an input a key at the next higher level in the hierarchy. In this case, pseudorandom cryptographic function 240 uses a server key and generates a security association key based on security association key derivation inputs 242. When a server k in enclave i is communicating with clients in enclave j, it generates a different security association key for each client m. Accordingly, a unique security association key $CK_{i,j,k,m}$ may be used for each security association.

Security association key $CK_{i,j,k,m}$ may be generated from server key $SK_{i,j,k}$ and a security association key derivation input 242 associated with security association m. The security association key derivation input 242 may be any suitable value. Preferably, the value is unique across the active security associations for that server and may therefore serve as an identifier of the security association. In some embodiments, the security association key derivation input may be a randomly-generated value. However, the value may be based on a time stamp, or any other suitable source of information.

In order to allow devices to generate security association keys from keys at a higher level in the hierarchy, the security association key derivation inputs may be made available to those devices. For example, if intermediary device 140A (FIG. 1A) is to monitor traffic sent from enclave 110A (FIG. 1A), intermediary device 140A is provided with the security association key derivation inputs used to generate security association keys for all security associations involving devices in enclave 110A. Any suitable mechanism may be used to make the security association key derivation inputs available. As one example, security association key derivation inputs may be included in messages encrypted using the security association keys generated from those inputs.

Figure 2B:
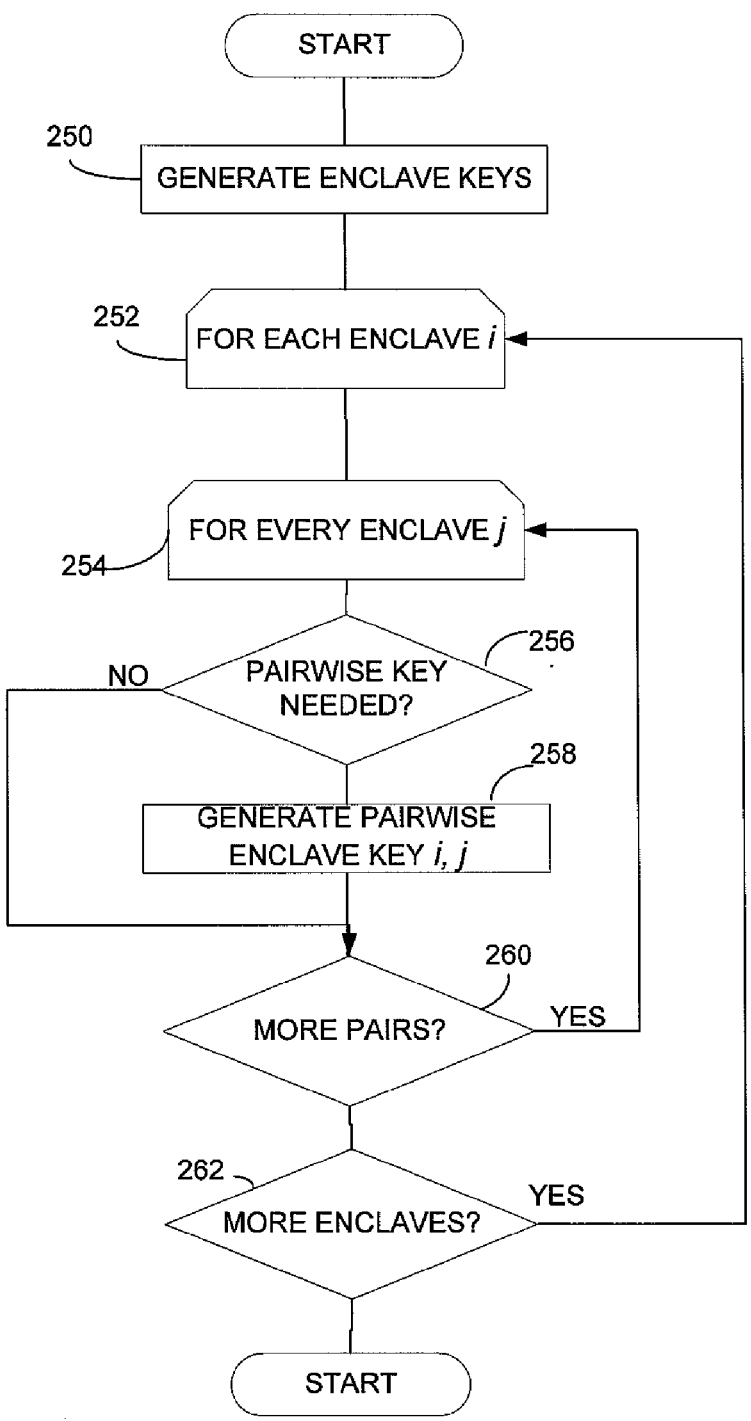
FIG. 2B is a flowchart of a process of generating pair-wise enclave keys according to some embodiments of the invention.

In the embodiment of FIG. 2A, each pair-wise enclave key is generated directly from the organization key 210. Other approaches are possible. In alternative embodiments, some of the pair-wise enclave keys may be generated indirectly from the organization key. FIG. 2B illustrates an embodiment in which enclave pair-wise keys are generated indirectly from an organization key based on interactions among enclave key servers.

The process of FIG. 2B begins at block 250. At block 250, enclave keys are generated. The enclave keys generated at block 250 may be used for generating keys for communications between devices within the same enclave. Accordingly, the enclave keys generated at block 250 may be regarded as the same as enclave pair-wise keys $EK_{i,j}$ when i equals j. The enclave keys generated at block 250 maybe generated in any suitable way. As one example, the enclave keys may be generated from organization key 210 using a pseudorandom cryptographic function as illustrated in FIG. 2A. However, in some embodiments, enclave keys may be provisioned in enclave key servers directly by a network administrator or obtained in any other suitable way. For example, they may be generated randomly.

Once a key is generated for each enclave, processing proceeds to loop start 252. Loop start 252 is the start of a loop repeated for each enclave, i. From loop start 252, the process proceeds to loop start 254. Loop 254 is the start of a sub-loop that is repeated for every other enclave, j.

Processing proceeds to decision block 256. At decision block 256, the process branches depending on whether a pair-wise key is required for the enclave pair (i,j). If a pair-wise enclave key is required, the process branches to block 258. At block 258, the pair-wise enclave key is generated for enclave pair (i,j).

The pair-wise key may be generated in any suitable way. As one example, a key exchange protocol may be performed between an enclave key server in enclave i and an enclave key server in enclave j. This key exchange may be used to independently generate and share the pair-wise key $EK_{i,j}$.

However, any suitable mechanism, using any suitable cryptographic function may be used to generate the pair-wise key. Once the pair-wise key is generated, processing proceeds to decision block 260 where processing loops back to loop start 254 if there are more enclave pairs to process. Processing continues in this fashion in the sub loop involving loop start 254, decision block 254, decision block 256 processing block 258 and decision block 260 until each enclave pair is processed. For enclave pairs for which no key pair is needed, possibly because no communication is to take place between devices in that pair of enclaves, processing bypasses the key generation step in block 258 by branching from decision block 256 to decision block 260.

Once the processing in the sub-loop beginning at loop start 254 is completed for every pair of enclaves involving the enclave i selected at loop start 252, processing will proceed from decision block 260 to decision block 262. At decision 262, processing will loop back to loop start 252 where the next enclave will be selected. The processing in sub loop 254 will be repeated for that next enclave. The processing will continue looping in this fashion until a pair-wise enclave key is generated for each pair of enclaves between which communication may take place.

Regardless of the manner in which pair-wise enclave keys are generated, they may be used to generate keys at lower levels in the hierarchy to ultimately form security associations between pairs of devices in the computer system. The specific pair-wise key from the set of pair-wise keys used in forming a specific security association depends on the enclaves in which the hosts for that security association are located. Such an approach involves having available information about the enclaves in which specific hosts may be located.

In some embodiments, each host may be provisioned with an indication of the enclave in which it is located. The enclave identification could then be provided by the host to a key server or other device that generates keys for use by that host. Alternatively, in some embodiments, a mechanism may be provided to allow a host to dynamically discover the enclave in which it is located. In some embodiments, the dynamic enclave discovery process may also allow a host to discover the enclave in which another host intended to serve as an opposite end point to a security association is located.

Figure 3:
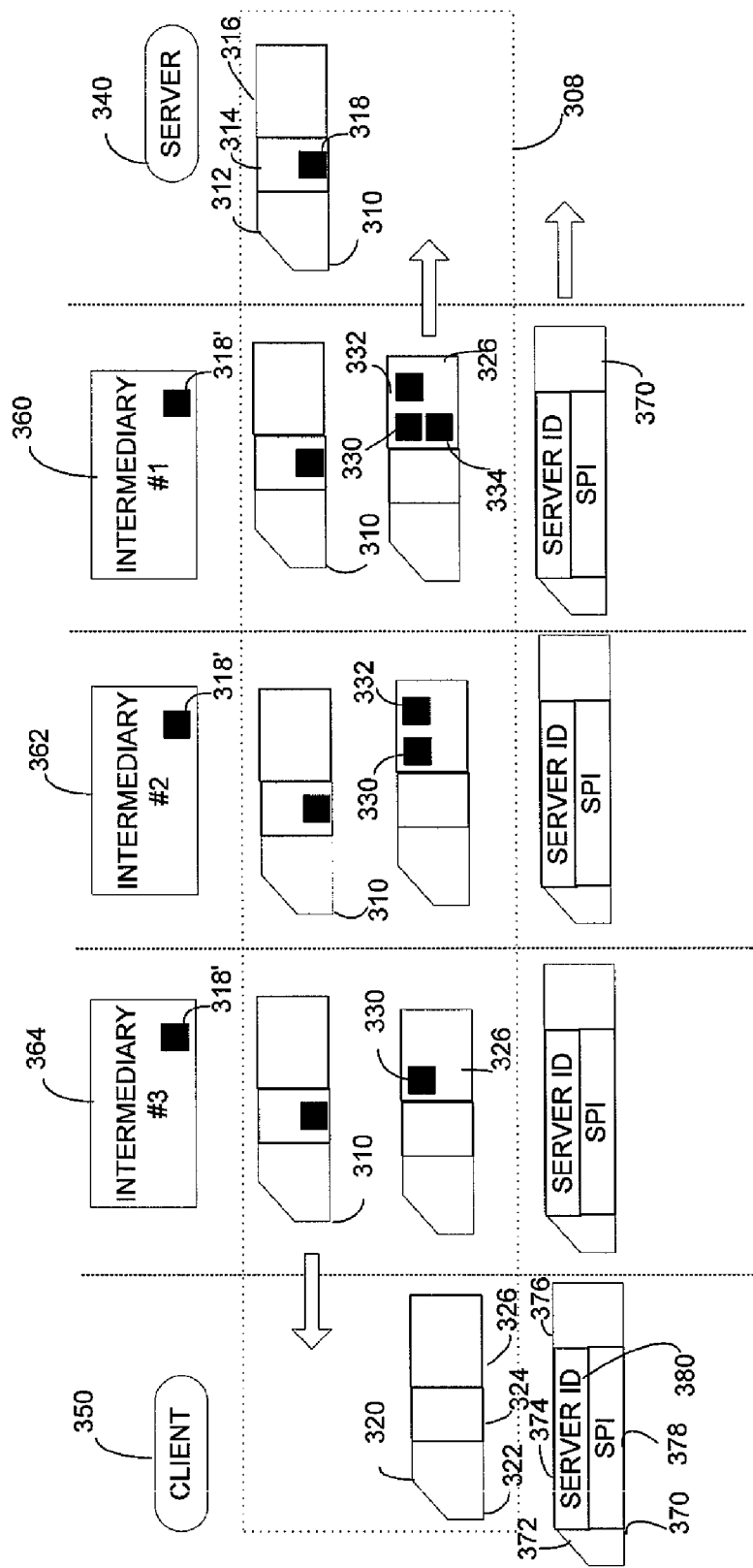
FIG. 3 is a schematic illustration of enclave discovery and communication protocols according to some embodiments of the invention.

In some embodiments, the enclave discovery process may be incorporated into a protocol for forming a security association. FIG. 3 illustrates a modification to a known protocol of forming a security association to allow at least one host to ascertain the enclaves in which one or both hosts are located.

FIG. 3 illustrates communications between a first host, acting as a server 340, and a second host, acting as client 350. In the embodiment illustrated, server 340 generates a key for communication according to the security association. Server 340 then distributes the key to client 350. Prior to generating and distributing the key, server 340 and client 350 exchange one or more control packets that control the key generation and distribution process. Accordingly, FIG. 3 illustrates steps in a process 308 for exchanging control information as part of generating and distributing a key.

Process 308 may be a process or portion of a process for forming a security association as known in the art. For example, process 308 may represent an exchange of packets in accordance with the internet key exchange (IKE) protocol or the AuthIP protocol. Each of these protocols involves the exchange of control packets between server 340 and client 350.

In the example of FIG. 3, process 308 involves a control packet 310 sent by server 340 to client 350. Client 350 responds with a control packet 320 sent to server 340. Control packets 310 and 320 may be formatted according to known protocols or in any other suitable way. In the example of FIG. 3, each of the control packets 310 and 320 includes multiple fields. Information not specified by the protocol may be inserted into one or more of these fields to support enclave discovery without departing from the protocol.

For example, control packet 310 is shown to have fields 312, 314 and 316. Here, three fields are shown for simplicity, but a control packet may have more fields than illustrated. In this example, an information element 318 is inserted in field 314 by server 340. Information element 318 may be used as part of the enclave discovery process.

Similarly, control packet 320 is shown with fields 322, 324 and 326. In this example, information elements to support enclave discovery are inserted into field 326. In the example of FIG. 3, information elements 330, 332 and 334 are inserted into field 326. Each of these information elements is inserted by an intermediary device that processes control packet 320 as it is routed through a network from client 350 to server 340. When server 340 receives packet 320, it extracts the information elements 330, 332 and 334 to determine its enclave and, optionally, the enclave in which client 350 is located.

In the embodiment illustrated, information element 318 is used to signal to the intermediary devices located in the network between server 340 and client 350 that server 340 is seeking information in accordance with the enclave discovery process. Information element 318 may be incorporated into control packet 310 in any suitable way. As one example, information element 318 may be added in a vendorID field of control packet 310, which may be a field defined in some known communication protocols. The value inserted into the vendorID field of control packet 310 may be any predefined code signaling that an enclave discovery process is desired.

As control packet 310 passes through the network between server 340 and client 350, it first passes through intermediary device 360. Intermediary device 360 may be a router or other multi-port device that processes control packet 310 in a known way such that control packet 310 continues on its path toward client 350. In addition to such known processing, intermediary device 360 may examine the contents of field 314. Upon detecting information element 318 having a value indicating that server 340 is seeking to engage in an enclave discovery process, intermediary device 360 may store an indication 318' that server 340 is seeking enclave discovery information. Intermediary device 360 may then monitor network traffic to detect packets addressed to server 340.

From intermediary device 360, control packet 310 may pass to another intermediary device, here illustrated as intermediary device 362. Intermediary device 362 may similarly process control packet 310, also storing an indication 318' that server 340 is seeking enclave discovery information. For intermediary device 362, control packet 310 may pass to further intermediary devices on its way to client 350. Here, one additional intermediary device, intermediary device 364 is shown. As with intermediary devices 362 and 360, intermediary device 364 stores an indication 318' that server 340 is seeking enclave discovery information.

Client 350 may respond to control packet 310 as is known in the art. A part of the response to control packet 310 may be generation of a subsequent control packet, here illustrated as control packet 320. As control packet 320 passes through the network towards server 340, it passes through intermediary devices 364, 362 and 360 that processed control packet 310. Accordingly, each of these intermediary devices is checking for network packets directed to server 340 into which the intermediary device can insert enclave discovery information. Intermediary device 364 therefore identifies control packet 320 as a control packet into which enclave discovery information is to be inserted.

In the embodiment illustrated, control packet 320 includes fields 322, 324 and 326. The specific number and content of the fields may be defined by the protocol in use for establishing a security association. However, in the embodiment illustrated, field 326 is an extensibility field, meaning that the protocol does not define requirements for the content of field 326. Accordingly, intermediary devices may insert information into field 326 without altering information needed for forming a security association between server 340 and client 350.

Intermediary device 364 inserts information into field 326 that server 340 may use as part of a process of determining enclaves for client 350 and/or server 340. In the embodiment illustrated, intermediary device 364 inserts an information element 330. Information element 330 indicates the enclave to which intermediary device 364 has been assigned. Because intermediary device 364 is the first intermediary device encountered by a packet sent by client 350, likely, intermediary device 364 is gateway or other multi-port device associated with the same enclave as client 350. Thus, information element 330 may be taken as an indicator of the enclave in which client 350 is located.

As control packet 320 passes through the network, it next is processed by intermediary device 362. Because intermediary device 362 is monitoring for packets directed to server 340, intermediary device 362 similarly detects control packet 320 and inserts an information element 332 identifying the enclave in which intermediary device 362 is located.

Information element 332 is inserted into field 326 in a fashion that reflects processing order of control packet 320. One simple mechanism for reflecting processing order is to insert information element 332 into a list following information element 330. However, any suitable structure for preserving ordering may be used.

As control packet 320 continues through the network, it is next processed by intermediary device 360. As with intermediary devices 362 and 364, intermediary device 360 inserts an information element 334, indicating the enclave in which intermediary device is located. Information element 334 is likewise inserted in a fashion that preserves the processing order, such as by appending it to the list of information already in field 326.

Accordingly, when control packet 320 reaches server 340, server 340 may analyze the contents of field 326 to determine the enclaves through which control packet 320 passed on a path from client 350 to server 340. The enclaves at either end of that path are likely indicators of the enclave in which server 340 and client 350 are located. The pair of enclaves identified by the information elements at either end of the list in field 326, here information elements 330 and 334, may be used to select a pair-wise key for generating the security association key used for a security association between server 340 and client 350. In the embodiment illustrated in FIG. 2A, this information may be used to select a specific server key to be used in generating a security association key.

It should be appreciated that FIG. 3 illustrates one example of an enclave discovery process and variations are possible. For example, in some embodiments, different paths through a network may result in control packets passing through different intermediary devices. As a result, server 340 may not in all scenarios receive consistent indications of its own enclave. In that scenario, server 340 may maintain information about its indicated enclave received at different times. Server 340 may analyze this information to determine its enclave location. As a further variation, when client 350 is aware of its enclave, it may insert the information into field 326 as the first information element in the list or otherwise signal its enclave position. In yet another variation, intermediaries may insert extra information along with their assigned enclave. For example, intermediaries may include information identifying other enclaves whose enclave keys they possess, so that the server can determine whether all the intermediaries along the path have the requisite pair-wise keys to process traffic between the client's discovered enclave and the server's discovered enclave.

FIG. 3 illustrates that intermediary devices each insert an information element for enclave discovery into the first packet they detect directed to server 340 following receipt of an information element 318. Intermediary devices may insert information elements into any suitable number of packets at any suitable time in relation to receipt of an information element 318. As an alternative, intermediary devices may insert information elements into multiple packets or for a predetermined amount of time following receipt of information element 318.

As an example of another variation, intermediary devices may insert information elements for enclave discovery without a specific indication from a server of a need for the enclave discovery information. In such an embodiment, intermediary devices may insert enclave discovery information into all packets or only packets of a certain type. For example, intermediary devices may insert information elements for enclave discovery into all control packets used in forming security associations, regardless of whether an information element requesting such enclave discovery has been previously detected by the intermediary device.

Regardless of the specifics by which the enclave discovery information is provided to server 340, once server 340 can identify its enclave and the enclave of client 350, it may generate a security association key or keys and complete the process of forming a security association with client 350 using a known protocol or in any other suitable way. Thereafter, server 340 and client 350 may communicate in accordance with that security association. FIG. 3 illustrates that, following process 308, client 350 and server 340 may exchange packets in accordance with the security association. A packet 370 is illustrated as an example.

Packet 370 may be formatted according to the protocol used to define the security association between client 350 and server 340. Packet 370 may contain multiple fields, of which fields 372, 374 and 376 are illustrated. Each field may contain different types of information. For example, field 376 may contain data that has been signed or encrypted with a security association key. Other fields within packet 370 may be used to route packet 370 through the network or otherwise in processing packet 370.

One such field in packet 370 may contain key derivation information used to generate the security association key for the security association between client 350 and server 340. Incorporating key derivation information within packet 370 allows any device that has access to a key at any level in the key hierarchy that was used to derive the security association key to re-generate a security association key and process packet 370. In the key hierarchy illustrated in FIG. 2A, such key derivation information may include the enclave pair in which client 350 and server 340 are located, the identity of the server that generated the security association key, and key derivation inputs 242 used to generate the security association key.

This information may be incorporated into packet 370 in any suitable way. In the example of FIG. 3, this information is recorded in a field 374 of packet 370. In the example illustrated, field 374 contains a server ID 380, which may identify the server that generated the security association key. Additionally, field 374 may contain a security parameter index (SPI), which may contain or identify other key derivation inputs. The SPI may identify a random number used as a key derivation input 242 (FIG. 2A) and/or the enclave pair in which client 350 and server 340 are located. However, it should be appreciated that FIG. 3 illustrates just one example of a mechanism by which key derivation information may be made available to devices processing packet 370.

As shown, the key derivation information field 374 is not encrypted. Nevertheless, security for packet 370 may be maintained because the key derivation inputs in field 374 are only useful for devices that contain a key from which the security association key was generated.

Any device authorized to obtain a key from which the security association key was generated can re-generate the security association key for processing packet 370. This process may be performed by server 340 or by any one of the intermediary devices, such as intermediary devices 360, 362 and 364.

Figure 4A:
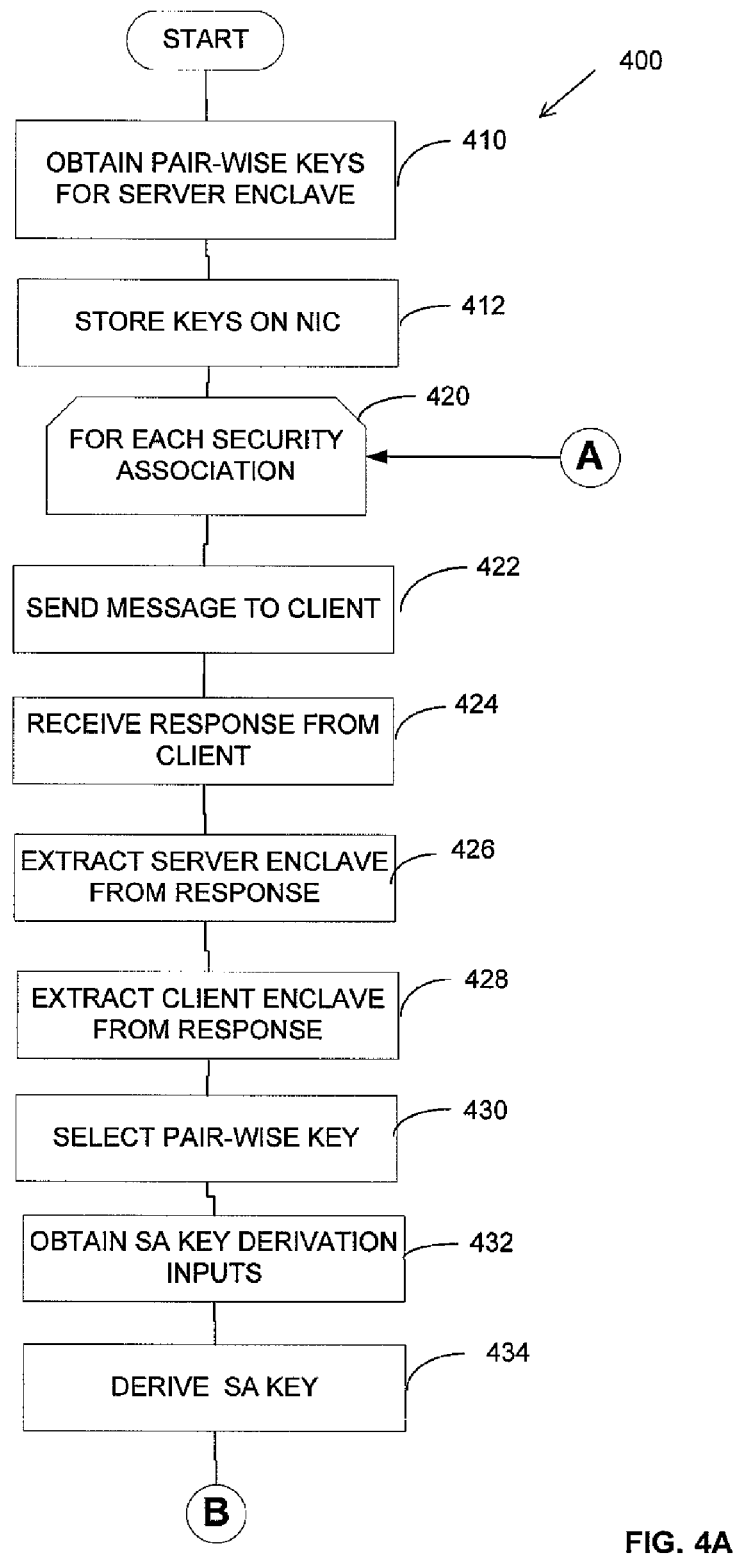
FIGS. 4A and 4B, when connected at the points labeled A and B, are a flowchart of a process of operating a server in a secure enclave.

In some embodiments, the processing to generate the security association key such that packet 370 may be processed may be offloaded to hardware in a network interface card or other suitable component of the computer device. That hardware, if it has access to the appropriate keys, can generate the security association key on the fly as packet 370 is processed and then use the generated key for processing information in packet 370. FIG. 4A illustrates a process 400 that may be performed in a server, such as server 340. However, a comparable process may be performed in any device, such as any of the intermediaries 360, 362 or 364.

Process 400 begins at block 410. At block 410, the server obtains pair-wise keys for the enclave in which the server is located. The enclave in which a server is located may be identified using an enclave discovery process as described above in connection with FIG. 3 or in any other suitable way.

The pair-wise keys obtained at block 410 may be enclave pair-wise keys, such as pair-wise keys 224A . . . 224D illustrated in FIG. 2A. Alternatively, in embodiments in which server pair-wise keys are generated from enclave pair-wise keys, the pair-wise keys obtained at block 410 may be server pair-wise keys such as keys 234A . . . 234D in FIG. 2A. Regardless of the specific format of the pair-wise keys, they may be obtained from any suitable source, such as a key server either inside or outside of the enclave containing the server that is to generate a security association key.

At block 412, the pair-wise keys are stored on the server. The keys may be stored in any suitable computer storage media associated with the server. However, in embodiments in which hardware offload of cryptographic functions is to be performed, the pair-wise keys may be stored within network interface hardware, such as a network interface card (NIC).

The process then proceeds to loop start 420, which is the start of a loop performed for each security association into which the server will enter. Within the loop that begins at loop start 420, the server may perform processing appropriate for one security association. That processing begins at block 422 where the server sends a message to the client that is to be the second host of the security association. Such a message may be in the form of control packet 310 (FIG. 3). However, any suitable message format may be used, including a message formatted specifically to elicit from the client, or from intermediaries on the message's path, an indication of the enclave in which it resides.

The process then proceeds to block 424, where the server receives a response from the client. Such a response may be in the format of control packet 320 (FIG. 3) into which intermediary devices have inserted enclave discovery information. However, the response received at block 424 may be in any suitable format, including a message formatted specifically by a client to convey its enclave.

Regardless of the format of the message sent at block 422 and the response received at block 424, the server may process the response at blocks 426 and 428 to ascertain the appropriate enclave pair of the client and server. At block 426, information identifying the server enclave is extracted from the response and at block 428 information identifying the client enclave is extracted from the response. Processing at blocks 426 and 428 may involve processing a list of information elements, such as 330, 332 and 334 (FIG. 3). However, the processing at block 426 and 428 may be performed in any suitable way to ascertain the appropriate enclave pair for the client and server.

Once the appropriate enclave pair is identified, at block 430 a pair-wise key is selected. In some embodiments, selecting a pair-wise key may entail accessing a key server. In other embodiments, selecting a pair-wise key may entail reading from a set of pair-wise keys previously downloaded to the server. For example, the selection may be based on keys obtained at block 410.

One of skill in the art will recognize that FIG. 4A is a simplified illustration and the steps of process 400 need not be performed in exactly in the order in the example. As one example of a possible variation, it should be understood that selecting a pair-wise key at block 430 may form a portion of the processing required to obtain pair-wise keys at block 410. Such a process may be used, for example, if there are a large number of pair-wise keys that possibly could be used. In that scenario, pair-wise keys may be downloaded dynamically and incrementally as processing at block 430 identifies specific pair-wise keys required to form security associations with clients in other enclaves.

Regardless of when and where the selected pair-wise key is obtained, the process proceeds to block 432. At block 432, key derivation inputs to generate a security association key are obtained. In some embodiments, a key derivation input may include a random number such that processing at block 432 may include generation of that random number. Alternatively or additionally, key derivation inputs may include an identifier of the server enclave detected at block 426 and an identifier of the client enclave detected at block 428.

Regardless of the specific derivation inputs and the sources from which they are obtained, processing may continue to block 434 where a security association key is derived. Processing at block 434 may involve performing a cryptographic function using the pair-wise key selected at block 430 in the key derivation inputs obtained at block 432. However, the security association key may be generated in any suitable way.

Figure 4B:
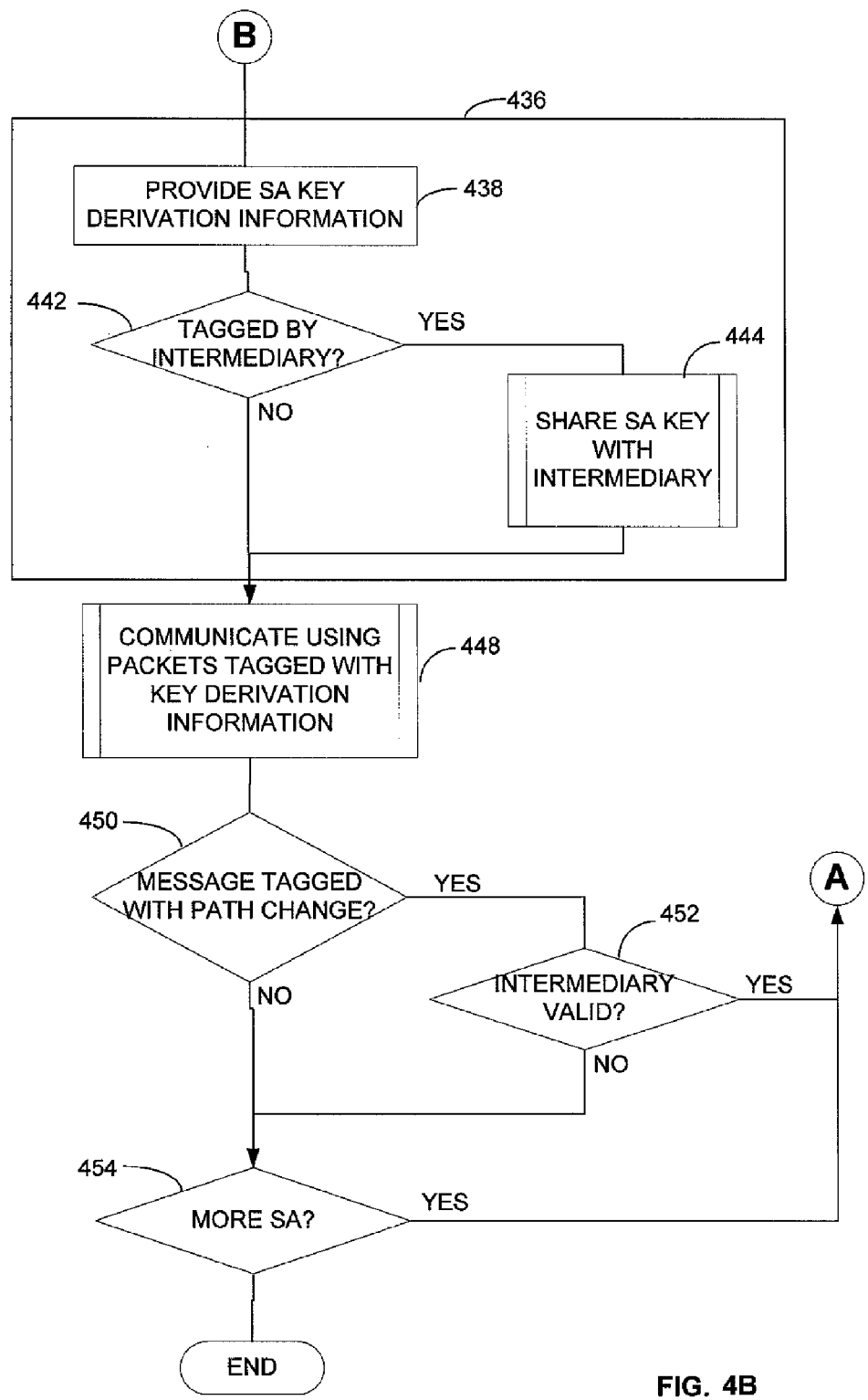

Generating a security association key may entail interactions between the server and the client such that both the client and the server have a copy of the security association key. The security association key may be generated by the server and then communicated to the client in any suitable way, including key exchange protocols as are known in the art. The key may also be generated on both client and server using other information shared between them. Examples of suitable key exchange protocols are IKE and AuthIP. Accordingly, FIG. 4B shows a key exchange subprocess 436. It should be appreciated that FIG. 4B schematically indicates that interactions take place by which both client and server share a key, and that those interactions may entail exchanging information at times other than as shown in FIG. 4B.

Regardless of how the security association key is communicated to the client, the process may also include communicating key derivation information to the client at block 438. Though the client may not use key derivation information for cryptographic processing on the packet, the client may tag packets sent over the security association with some or all of the key derivation information. Tagging the packets in this way allows devices, particularly intermediary devices that did not directly participate in the key exchange, to regenerate the security association key so that they can process packets sent over the security association.

Block 448 illustrates that, following the key exchange in subprocess 436, including providing key derivation information at block 438, at block 448, the client and server may communicate over the security association using packets tagged with some or all of the key derivation information.

Process 400 may be performed in any suitable hardware associated with the server. Some or all of process 400 may be controlled by software executing on one or more processors within a server. Also, some or all of the steps of process 400 may be offloaded to other hardware associated with the server. For example, cryptographic functions associated with processing packets communicated at block 440 may be offloaded to hardware within a network interface for the server.

As noted above, a hierarchical distribution system allows intermediary devices that are authorized to have access to keys to process packets in security associations. In some computer systems, not all intermediary devices that are intended to process the packets in a security association may support such hierarchical key generation. In those embodiments, servers may support direct key exchange with authorized intermediaries. The direct key exchange may be triggered in any suitable way. For example, intermediaries may signal to end hosts their need for direct key exchange via a signaling mechanism similar to that used for enclave discovery.

FIG. 4B illustrates that an intermediary, upon detecting packets forming a security association for which the intermediary device does not have a security association key, may provide information in a packet directed to the server. That information may act as a request for the server to engage in a direct key exchange with the intermediary device. For example, FIG. 3 illustrates control packets communicated as part of establishing a security association. An intermediary device may, for example, set a flag in a field of control packet 320 directed to server 340. Such a flag may serve as a request for server 340 to engage in a direct key exchange protocol with the intermediary device.

FIG. 4B illustrates that when the server receives such a flagged packet, processing may branch from decision block 442 to block 444. At block 444, the server may share the security association key with the intermediary. The server may share the key in a suitable way, including by using a key exchange protocol, as is known in the art. Such a process may include validating that the intermediary device is authorized to have access to information communicated over the security association.

In the embodiment illustrated, the packet to which a flag detected at block 442 may be attached is a control packet associated with establishing a security association. In some scenarios, intermediary devices may enter or leave a path between a client and a server after a security association is established. Such changes in network paths can occur, for example, as a result of changes in the network configuration or conditional processing in multiport devices that changes packet routing as a result of load or other conditions that may vary during operation of a network. In embodiments in which each intermediary device that is authorized to process packets associated with the security association obtains key derivation information from the packets, any new intermediary that enters a path after a security association is formed can, to the same extent as intermediary devices in the path at the time the security association was formed, access packets. However, an intermediary device that cannot perform dynamic key generation using the hierarchical keys as described above, when newly added to the path after the security association is formed, is unable to signal the server as part of the security association formation to perform a direct key exchange with the intermediary device. Accordingly, a computer system according to some embodiments may incorporate a mechanism for an intermediary that does not support dynamic key generation to obtain an appropriate security association key.

In the example illustrated in FIG. 4B, such an intermediary device may flag any packet directed to the server. Such a flag may be interpreted by the server as a request to re-key a security association. As part of the re-keying, that intermediary device can request direct re-keying from the server, as described in conjunction with decision block 442 and block 444. Accordingly, the process of FIG. 4B includes a decision block 450 where the processing branches if the server receives a packet flagged with a request from an intermediary device to perform a re-key operation.

If such a request is received, the process branches from decision block 450 to decision block 452. At decision block 452, the process again branches, depending on whether the server determines the intermediary device inserting the tag is a valid intermediary device. Any suitable approach for determining a valid intermediary device may be used. As one example, the server, upon receiving such a flagged packet, may verify the integrity of the packet to ascertain that the intermediary who set the flag is in a path traversed by an authentic packet flowing between the server and the client participating in the security association.

Regardless of how the validity of the intermediary device is determined, if the intermediary device is not valid, the process branches to decision block 454. Conversely, if the request is from a valid intermediary, the process loops back to loop start 420, where the process of establishing the security association is repeated.

Processing at blocks 422, 424, 426, 428, 430, 432, 434, 436, 438, 440, 442, 444, 450 and 452 may be performed for each active security association. Accordingly, FIG. 4B illustrates that when that processing for one security association is completed, the process may loop from decision block 454 back to loop start 420, where the process may be repeated for other active security associations. It should be appreciated that, although FIGS. 4A and 4B illustrate sequential processing, this processing is illustrated sequentially for simplicity of illustration only and that the processing for multiple security associations may be performed concurrently, or at any other suitable times.

Figure 5:
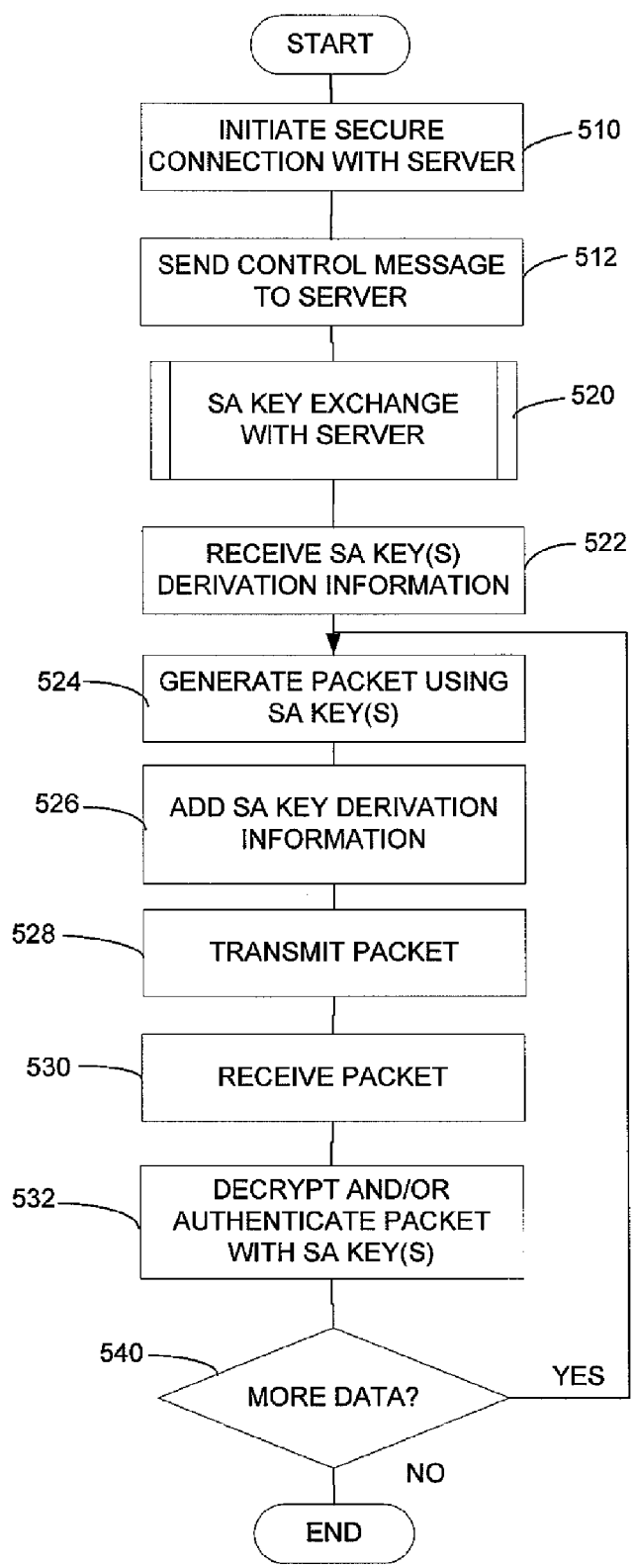
FIG. 5 is a flowchart of a process of operating a client in a secure enclave according to some embodiments of the invention.

FIGS. 4A and 4B illustrate processing performed on a server, which is one host for a security association. Processing is also performed on a client, which may be a second host of a security association. FIG. 5 provides an example of processing that may be performed on a client.

The process of FIG. 5 begins at block 510 where a secure connection with a server is initiated. The connection may be initiated by processing on the client, by processing on the server or in response to any suitable event.

The secure connection may be formed in any suitable way. Forming a secure connection may entail sending one or more control messages from the client to the server, as is reflected by processing at block 512. The processing at block 512 may entail sending a control message, such as control message 320 (FIG. 3), or the sending and/or receiving of one or more control messages by the client.

Forming a secure connection may also entail performing a key exchange protocol with the server. At block 520, the client may participate in such a key exchange as a result of which the client obtains a security association key from the server.

In some embodiments, no modifications to a client may be required in order to use hierarchical keys as described above. Accordingly, processing at blocks 510, 512 and 520 may be performed using techniques as are known in the art. However, any suitable processing may be performed.

Once the security association is formed, processing may proceed to block 522 where the client receives key derivation information. As described above, messages sent using a security association may be tagged using key derivation information such that any authorized device receiving those packets can generate the appropriate security association key. In the embodiment illustrated, packets communicated in accordance with the security association, whether initiated by a client or a server, are tagged with the key derivation information. Accordingly, at block 522, the client receives and stores the key derivation information. Receiving derivation information at block 522 may entail receiving a packet from the server containing that key derivation information. However, any suitable mechanism for providing key derivation information to the client may be used at block 522.

Once the client has both the security association keys and key derivation information, it may begin communicating packets using the security association. At block 524, a packet is generated using the security association key. Processing at block 524 may be performed using techniques as are known in the art for generating packets according to a security association.

At block 526, the key derivation information received at block 522 may be attached to the packet generated at block 524. In an embodiment such as is illustrated in FIG. 2A in which there are four levels of key hierarchy, the key derivation information may include key derivation information from all levels of key generation. Accordingly, information added at block 526 may include enclave pair information, server identity information, and a value used by the server to generate the security association key. However, the specific information added at block 526 may depend on the number of levels in the key hierarchy and the specific derivation information used to generate keys at each level of the hierarchy.

Once the packet is formatted, processing proceeds to block 528. At block 528 the client transmits the packet to the server. At block 530, the client may receive a packet from the server. At block 532, the client may decrypt and/or authenticate the received packet using the security association keys obtained in block 520. Processing at blocks 528, 530 and 532 may be performed using techniques as are known in the art. However, any suitable mechanism for transmitting, receiving and decrypting and/or authenticating packets may be used.

The process then may proceed to decision block 540 where the process may branch, depending in whether more data is to be sent or received using the security association. When more data remains to be processed, the process looks back to block 524 where the client may generate and/or receive further packets using the security association. When no further data remains for communication between the client and the server, the process of FIG. 5 may end.

Figure 6:
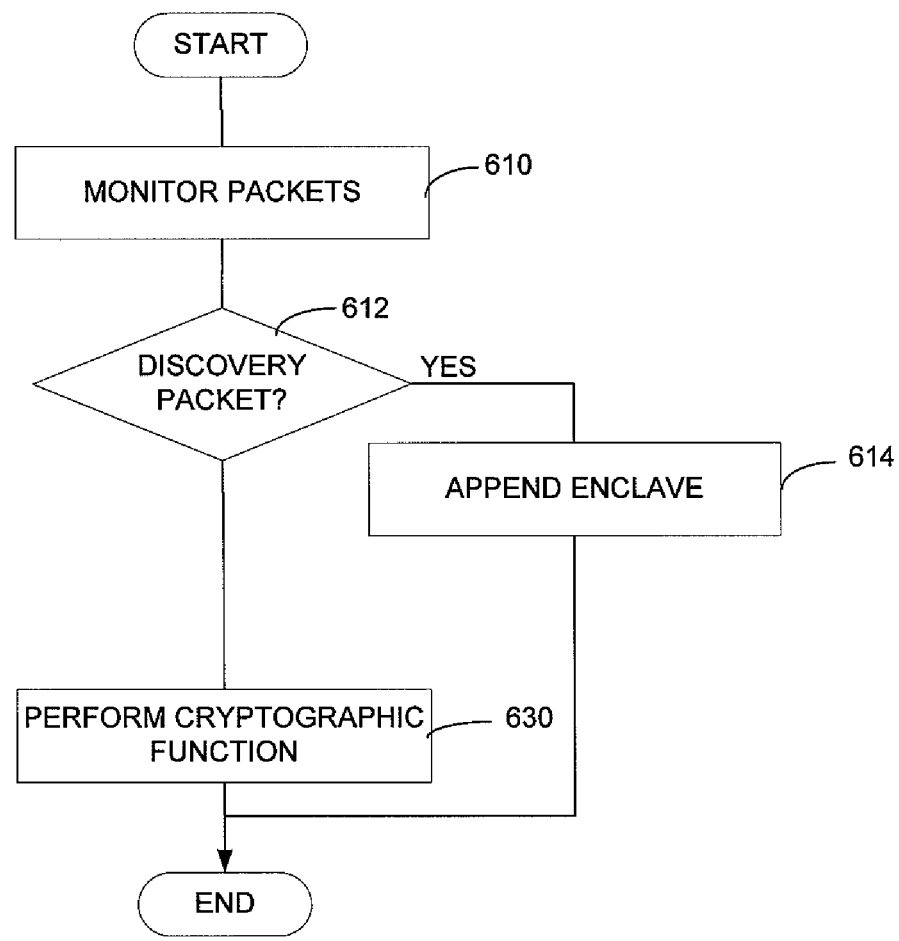
FIG. 6 is a flowchart illustrating a process of operating an intermediary device according to some embodiments of the invention.

FIG. 6 illustrates a process that may be performed by an intermediary device. As described above, an intermediary device may participate in an enclave discovery process. Additionally, intermediary devices may monitor and process packets transmitted in accordance with security associations involving other devices.

FIG. 6 illustrates that an intermediary device may monitor packets at block 610. At block 610, the intermediary device may detect packets passing over the network. This monitoring may be performed using circuits and techniques as are known in the art, though any suitable approaches may be used to detect packets transmitted over a network.

When the intermediary device detects a packet, processing may branch at decision block 612, depending on whether the packet is tagged as a discovery packet. In the embodiment of FIG. 3, a packet may be tagged as a discovery packet by including information element 318 in a field, such as field 314. However, any suitable mechanism may be used to designate a discovery packet.

Regardless of the specific manner in which a discovery packet is identified, processing may branch from the decision block 612 to block 614 when a discovery packet is discovered. At block 614, the intermediary device may append an indication of its enclave to one or more packets. In some embodiments, the packet to which the enclave information is appended may be the same as the discovery packet. In that scenario, the enclave discovery information at block 614 may be received by the host opposite the host that generated the discovery packet. Alternatively, as indicated in FIG. 3, the enclave information may be appended to a subsequent packet directed to the host that generated the discovery packet. Regardless of the specific response to the discovery packet, once that response is completed, the processing of FIG. 6 may end.

If a packet detected by monitoring at block 610 does not contain the discovery packet, the process may branch from decision block 612 to block 630. At block 630, an intermediary device may perform a cryptographic function on the packet, which may entail generating the security association key based on key derivation information in the received packet and a key at a higher level in the hierarchy available to the intermediary device. The specific cryptographic function performed by the intermediary device may depend on the nature of the intermediary device and the information in the packet. Regardless of the cryptographic functions performed, once they are completed the process of FIG. 6 may end.

Figure 7:
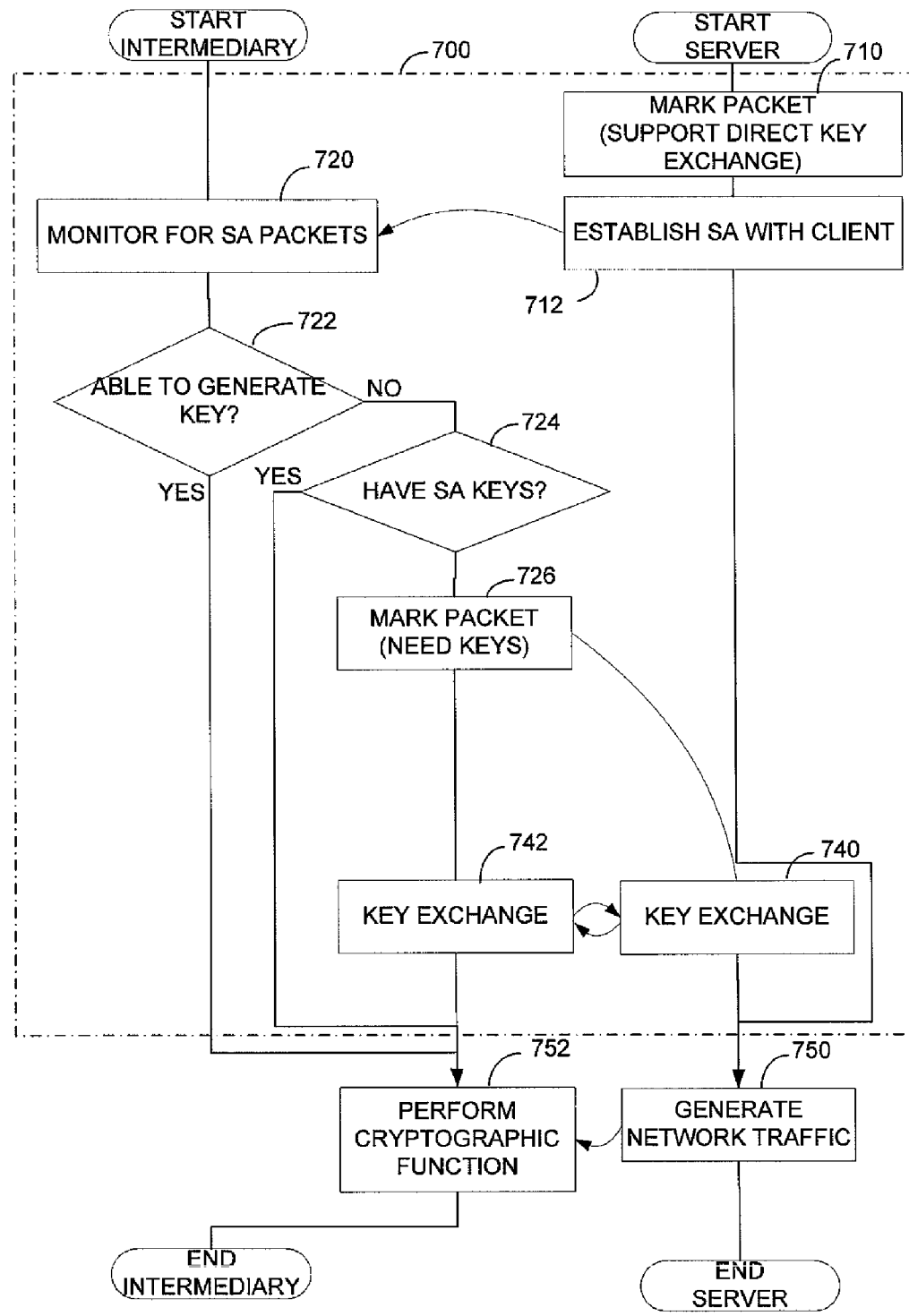
FIG. 7 is a flowchart of a process involving interaction between an intermediary device and a server during which the intermediary directly device receives keys from the server.

As described above, one use of a hierarchical key distribution system is that it facilitates incorporating into a computer system intermediary devices that can monitor packets communicated using security associations. There are multiple network management or protection functions that may be performed by intermediary devices that can monitor network traffic protected through a security association. In some embodiments, intermediary devices may be provisioned with keys that allow them to generate security association keys using key derivation information associated with network packets. Such devices may be implemented with network interface hardware that provides secure enclave offload support. However, in a large enterprise, not all intermediary devices may have such network interface hardware and may not otherwise support generation of security association keys using key generation information, or may not have access to the key servers that provide higher-level keys from which to derive security association keys. Accordingly, in some embodiments, a protocol for use in a computer system may provide for a mechanism for one or more security association or higher-level keys to be directly provided to an intermediary device. FIG. 7 is an example of interactions between a server and an intermediary device in which the intermediary device may signal to the server that it requires a direct transfer of a security association key or higher-level key and the server may respond with that key.

The process of FIG. 7 begins with a sub process 700 during which the server creates a security association with a client and also provides, through a direct key exchange, the security association key to the intermediary device. The sub process 700 begins at block 710 where the server marks at least one of the control packets used to establish a security association with an indicator that the server supports a direct key exchange with intermediary devices. The marker applied at block 710 may be in any suitable form. For example, in the message exchange indicated in FIG. 3, an information element, similar to information element 318 though with a different value, may be placed in a control packet 310.

At block 712, the server may begin the process of establishing the security association with a client. Establishing the security association may include sending the marked packet generated at block 710.

The packets exchanged between server and client as part of establishing the security association will pass through the intermediary device. At block 720, the intermediary device monitors network traffic and detects the packets being communicated between the server and client associated with establishing a security association. When such a packet is detected, processing may proceed to decision block 722, where the process may branch depending on whether the intermediary device can use secure enclave key generation to generate a key for processing the packet. If so, sub process 700 may complete, with processing passing to blocks 752 for the intermediary device and block 750 for the server.

At block 750, the server may generate network traffic using the security association established with the client. The packets sent as part of the security association will be detected at block 752 by the intermediary device. Because the intermediary device supports processing using secure enclave keys, the intermediary device may generate the security association keys needed to perform cryptographic processing on the network traffic generated at block 750. Accordingly, at block 752, the intermediary device may monitor and otherwise process that network traffic.

Conversely, if the intermediary device cannot generate a key, the process may branch at decision block 722 to decision block 724. The intermediary device may be unable to generate a key for any of a number of reasons. For example, the intermediary device may not support secure enclave key generation at all. Alternatively, the device may support key generation, but may lack a key at an appropriate level to process a received packet. In the embodiment illustrated, processing branches to decision block 714 regardless of why the intermediary device cannot generate a key. However, other embodiments are possible in which different processing is performed depending on the reason that a key was not generated.

At decision block 724, the process may again branch. At block 724, the process branches depending on whether the intermediary device has access to the security association keys established by the server. The keys may be made available to the intermediary device through some out of band process or in any other suitable way. Regardless of how those keys might be made available to the intermediary device, if the intermediary device has the security association keys necessary to perform cryptographic processing on network traffic generated between the server and the client as part of the security association, the process may branch from decision block 724 to blocks 752 and 750 where, as described above, the server and client may generate network traffic, which may be monitored by the intermediary device.

However, if the intermediary device does not support generation of a security association key or does not otherwise have access to the security association key or any higher-level keys, the process may branch from decision block 724 to block 726. At block 726, the intermediary device signals the server that it requires the security association key or a higher-level key for the security association established at block 712. The intermediary device may signal this need to the server in any suitable way. As one example, the intermediary device may mark a control packet, such as control packet 320 (FIG. 3) with an indication that security association keys are required. Any suitable information element may be added to a packet to signal to the server the need for security association keys or higher-level keys.

When the server receives a packet marked by the intermediary device at 726, the server may initiate a key exchange process at block 740. At block 740, the server performs a key exchange with the intermediary device. The protocol for the key exchange may be in the same format as is used to provide security association keys to the client. However, any suitable protocol may be used for the key exchange at block 740 and 742. The key exchange messages may also be included in the control packets passed between the server and the client, much as the markings indicating support or need for direct key exchange were so included. Moreover, the key exchange may involve the server contacting a key server to obtain higher-layer keys suitable for the intermediary, encrypted so that only the intermediary (and not the server) can decrypt them.

Once the key exchange is completed, the process may continue to blocks 750 and 752 where, as described above, the server and client may generate network traffic using a security association, which may be monitored at block 752 by the intermediary device using the security association keys obtained at block 742.

The process of FIG. 7 is possible because both the server and intermediary device support a direct key exchange according to the protocol illustrated in FIG. 7. In embodiments in which the server does not support direct key exchange, the packet received at block 720 will not be marked with the indication provided at block 710. In this scenario, the intermediary device may forgo requesting a direct key exchange, such as is indicated at block 726. Instead, the intermediary device may take one or more other actions to attempt to obtain the security association keys in another fashion or may log an error or other indication that it was unable to monitor network traffic for a security association.

Figure 8:
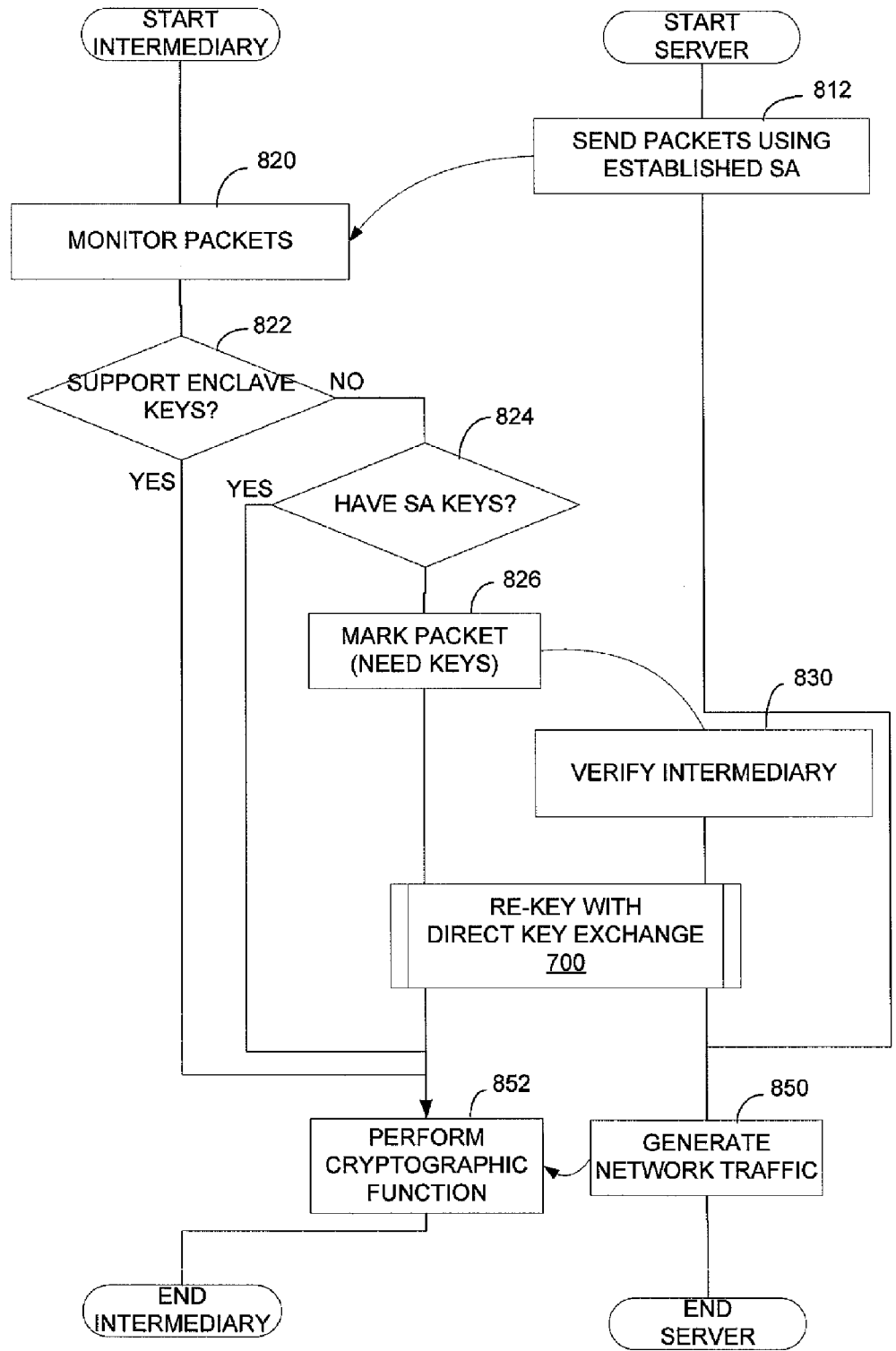
FIG. 8 is a flowchart of a process involving interactions between an intermediary device and a server during which the intermediary device triggers rekeying of a security association.

Also, it should be appreciated that the process of FIG. 7 relies on information communicated between the server and the intermediary device in control packets exchanged while the server is establishing a security association with a client. In some scenarios, an intermediary device may not be in a path between the server and the client while the security association is established. Nonetheless, an intermediary device may be able to trigger a direct key exchange. FIG. 8 illustrates processing that may be performed in that scenario.

The processing of FIG. 8 begins at block 812 where the server is already communicating with a client in accordance with an established security association.

At block 820, the intermediary device may monitor the packets exchanged between the client and server. However, because the intermediary device lacks the security association keys for that security association, it can perform no cryptographic functions on those packets. It cannot, for example, decrypt encrypted information in the packets or alter in any way packets that have been assigned while forwarding authenticated packets. However, as part of the monitoring at block 820, the intermediary device can identify that the server has created a security association.

At decision block 822, the process may branch, depending on whether the intermediary device supports generation of the security association key, and has obtained the necessary higher-level key. If so, the process may branch to blocks 850 and 852. At block 852, the server generates network traffic as part of the security association with the client. At block 852, the intermediary device may monitor that network traffic, including performing cryptographic functions using security association keys it has generated.

Conversely, if the intermediary device does not support the generation of security association keys, the process may branch to decision block 824. At decision block 824, the process may branch depending on whether the intermediary device has otherwise obtained the security association keys. If so, the process branches to blocks 850 and 852 where the client and server generate network traffic as part of the security association, which is monitored by the intermediary device using the security association keys.

If the intermediary device does not have security association keys and cannot generate them, then the process branches from decision block 824 to block 826. At block 826, the intermediary device provides a signal to the server indicating that it does not have the security association keys. This signal may be provided in any suitable way. For example, when the packets are communicated according to IPsec, the processing at block 826 may involve setting a flag in an IPsec packet destined for the server. In the example of FIG. 3, the flag may be set in a packet, such as packet 370. Any suitable mechanism for signaling the server may be employed at block 826.

When the server detects the signal from the intermediary device, processing on the server continues to block 830. At block 830, the server verifies that the packet marked at block 826 was marked by an authorized intermediary device in the path between the server and the client. Any suitable mechanism may be used to make this determination. For example, the server may verify the integrity of the packet, and thus conclude that it originated at the client, and therefore must have been marked by an intermediary with access to packets on the path between the client and the server.

When processing at block 830 determines that the intermediary device is an authorized intermediary that should obtain security association keys, the server may initiate a rekeying operation of the security association with the client. Repeating the rekeying operation allows the intermediary device to request direct keying. Accordingly, following verification at block 830, sub process 700 as described above in connection with FIG. 7 may be performed. Of course, if the intermediary cannot be verified, the process may terminate or other action may be taken that avoids letting unauthorized devices trigger a re-keying.

As a result of performing sub process 700, the intermediary device may have the security association keys in use for a security association between the server and the client. Accordingly, at blocks 850 and 852, the server and client may generate network traffic, which can be monitored by the intermediary device. Because the intermediary device has access to the security association keys, that monitoring may include performing cryptographic functions.

Figure 9A:
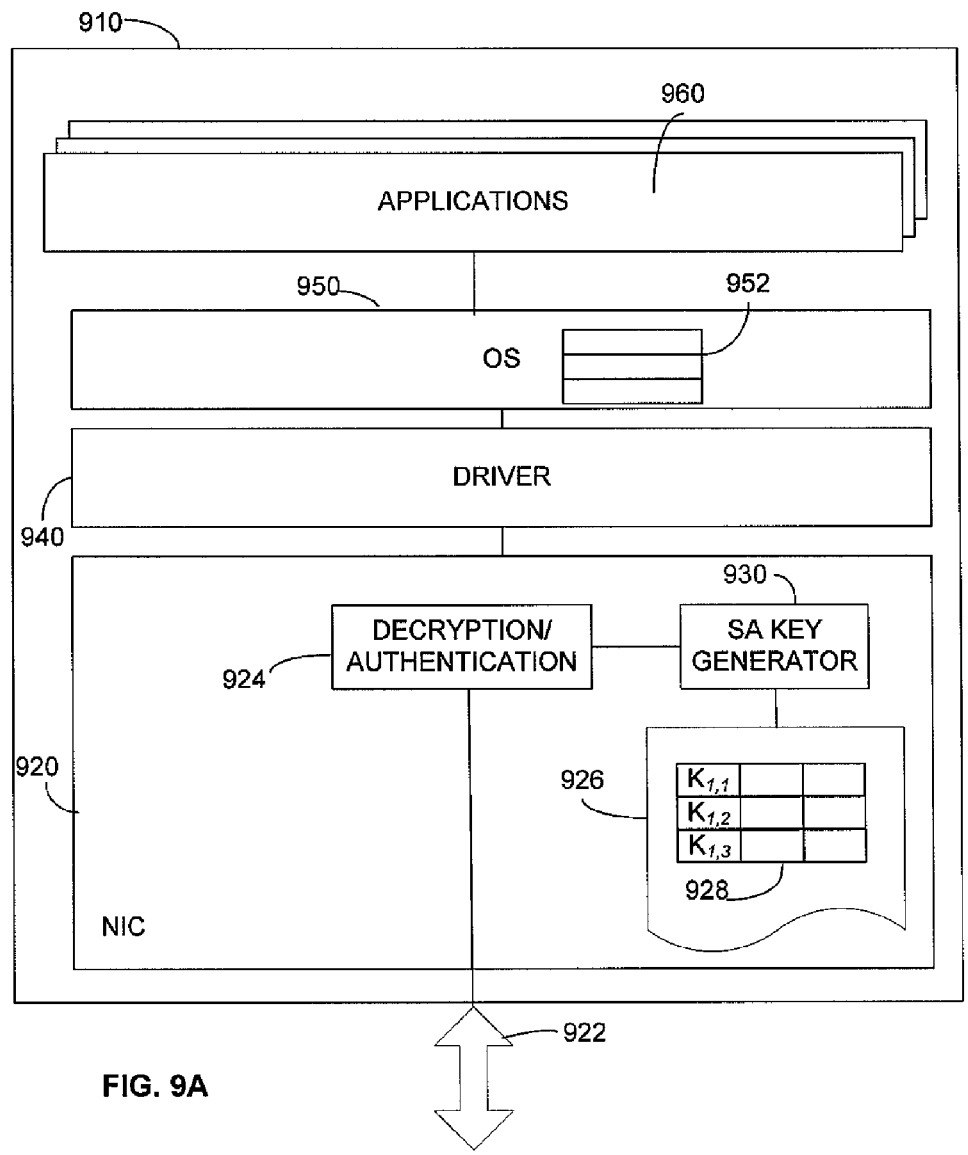
FIG. 9A is a simplified schematic of a server according to some embodiments of the invention.

The processing described above may be performed within the hosts and intermediary devices using any suitable hardware resources. However, one use of a hierarchical key distribution system is to enable hardware offload processing of some cryptographic functions. FIG. 9A illustrates an architecture of a computing device that may use hierarchical keys to support hardware offload processing.

In the example of FIG. 9A, device 910 includes network interface hardware 920. Network interface hardware 920 may be a network interface card or other suitable hardware component. Network interface hardware 920 may contain circuitry implemented in any suitable way. For example, it may contain one or more application specific integrated circuits, programmable logic devices or microprocessors programmed with microcode to perform functions associated with interfacing to a network, illustrated schematically as network 922.

Network interface hardware 920 may include hardware components as are known in the art for performing known network interface functions. In addition, network interface hardware 920 may include hardware components that can generate a security association key based on keys from a higher level of the key hierarchy stored on the network interface card. Accordingly, FIG. 9A illustrates that network interface hardware 920 includes memory 926. Stored in memory 926 may be a data structure 928 containing one or more pair wise keys from which security association keys may be generated. In the example of FIG. 9A, data structure 928 is illustrated in a state in which it holds three pair-wise keys, denoted keys K1,1, K1,2 and K1,3. This state, for example, may be appropriate when device 910 is located within enclave 1 and communicates with other devices in enclave 1 as well as devices in enclaves 2 and 3. However, it should be appreciated that FIG. 9A is a simplified illustration of a network device and network devices may contain many more than three keys.

Regardless of the number of keys contained in data structure 928, the keys may be accessed by security association key generator circuit 930. Security association key generator circuit 930 may receive key derivation information in conjunction with a packet received over network 922. In response, security association key generator circuit 930 may access memory 926 to obtain an appropriate pair-wise key from data structure 928. Using the pair-wise key, security association key generator 930 may generate the security association key.

The generated security association key may be provided to other components on network interface hardware 920 for use in performing cryptographic functions. In the example illustrated in FIG. 9A, the security association key is provided to decryption/authentication circuit 924. Decryption/authentication circuit 924 uses the security association key to decrypt or authenticate the packet. Once decrypted or authenticated, the packet may be provided to components at higher levels of the architecture within device 910.

As illustrated in FIG. 9A, once cryptographic functions have been performed on a received packet, the packet may be provided through driver 940 to a network stack 952 within operating system 950. From there, the packet may be provided to an application 960. Such processing within driver 940, operating system 950 and applications 960 may be performed using known techniques. As is known in the art, a possible implementation of a driver 940, operating system 950 and applications 960 is as computer executable instructions that are executed by a central processing unit within device 910.

In addition to performing processing associated with receipt of packets, network interface hardware 920 may optionally be operated to perform processing associated with transmission of packets. When used for transmission, rather than receiving key derivation information over network 922, security association key generator 930 may receive key derivation information from driver 940 or some other component within device 910. Regardless of the source of the key derivation information, security association key generator circuit 930 may access data table 922 to obtain the appropriate pair-wise key and provide a security association key to other components within network interface hardware 920.

FIG. 9A illustrates a device configured to act as a server in a secure enclave. A similar architecture may be used for other devices within a computer system. For example, generally the same architecture may be used for an intermediary device, though an intermediary device may have at least two network connects and may have two copies of network interface hardware 920.

Figure 9B:
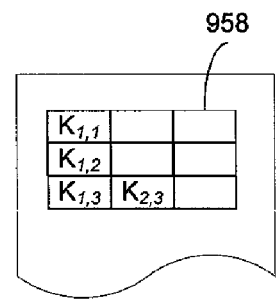
FIG. 9B is a sketch of a memory structure that may exist in network interface hardware of an intermediary device according to some embodiments of the invention.

When used to implement an intermediary device, the applications 960 may be applications that perform network monitoring functions or other functions that may be performed by intermediary devices. In addition, an intermediary device may store different pair-wise keys than a server. FIG. 9B illustrates an alternative configuration of a data table 958 that may be used in place of data table 928 if device 910 is configured as an intermediary device. As can be seen in FIG. 9B, when configured for an intermediary device, data table 958 may contain pair-wise keys for more than one enclave.

In this case, data table 958 is shown containing pair-wise keys associated with enclave 1. Additionally, data table 958 contains a pair-wise key for enclaves 2 and 3. This configuration of data table 958 may be appropriate, for example, for an intermediary device that receives communications to and from enclave 1 and between enclaves 2 and 3. It should be recognized, though, that the configuration of a data table containing pair-wise keys may be based on the position of the device in which the data table resides in the overall network as well as the enclaves for which the device is to have access to message traffic.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A device for providing secure communications, comprising: a memory and a processor that are respectively configured to store and execute instructions, including instructions that enable the device to:
   receive a control packet during an exchange, between the device and a second device, to establish a security association with the second device;
   identify a chain of two or more markers in the control packet, each marker of the chain of two or more markers indicating an enclave, and at least one marker of the chain of two or more markers including a value associated with an intermediary device that processed the control packet;
   determine an identity of an enclave in which the second device is located based at least on the chain of two or more markers;
   determine an identity of another enclave; and
   employ the determined identity of the enclave to establish the security association with the second device, including:
      selecting a key based at least on the determined identity of the enclave and the determined identity of the other enclave.

2. The device of claim 1, wherein the instructions include additional instructions that enable the device to:
   determine the identity of the other enclave based at least on the chain of two or more markers, wherein the device is located in the other enclave.

3. The device of claim 1, wherein the instructions that enable the device to employ the determined identity to establish a security association include instructions that enable the device to:
   select a pair-wise enclave key from a plurality of pair-wise enclave keys based at least on the determined identity of the enclave.

4. The device of claim 1, wherein the control packet is an Internet Key Exchange (IKE) or an AuthIP packet.

5. The device of claim 1, wherein the instructions include additional instructions that enable the device to:
   transmit another control packet to the second device, the other control packet including a request for intermediary devices between the device and the second device to place markers in packets addressed to the device.

6. The device of claim 1, wherein the key derivation information includes an identifier of a server device that generated a first key and a security parameter index (SPI) that indicates how a second key for the security association with the second device is to be derived from the first key.

7. The device of claim 1, wherein the control packet includes key derivation information for establishing the security association with the second device, the key derivation information including the chain of two or more markers.

8. An intermediary device for providing secure communications, comprising:
   a memory and a processor that are respectively configured to store and execute instructions, including instructions that enable the intermediary device to:
      receive a control packet transmitted by a first host device to a second host device as part of an establishment of a security association;
      determine that the control packet contains a request for intermediary devices to place markers in at least some packets addressed to the first host device; and in response to a determination that the control packet contains the request:
  store an indication that the first host device is seeking information relating to enclave membership;
  monitor message traffic for at least one other packet addressed to the first host device; and
  insert a marker that indicates an enclave to which the first host device belongs into a field of the at least one other packet, wherein the enclave is associated with one or more pairwise enclave keys from which security associations between the first host device and the second host device may be generated.

9. The intermediary device of claim 8, wherein the instructions include additional instructions that enable the intermediary device to:
  route packets between the first host device and the second host device.

10. The intermediary device of claim 8, wherein the instructions that enable the intermediary device to insert the marker include instructions that enable the intermediary device to:
  append the marker to a chain of markers in the at least one other packet, wherein the marker indicates an enclave to which the intermediary device belongs.

11. The intermediary device of claim 8, wherein the instructions include additional instructions that enable the intermediary device to:
  generate a security association key for a security association between the first host device and the second host device.

12. The intermediary device of claim 8, wherein the instructions include additional instructions that enable the intermediary device to:
  derive a security association key for a security association between the first host device and the second host device based on information from the control packet and/or the at least one other packet.

13. A computer-readable memory having computer-executable instructions stored therein for causing a host computing device to perform operations to provide secure communications between the host computing device and another host computing device, the operations including:
  generating a first packet that includes a request for intermediary devices between the host computing device and the other host computing device to provide enclave membership information to the host computing device;
  transmitting the first packet to the other host computing device via at least one intermediary device;
  receiving a second packet transmitted from the other host computing device, wherein the second packet includes at least one indication, added by the at least one intermediary device, of at least one enclave associated with the at least one intermediary device;
  determining an enclave to which the host computing device belongs based at least upon the at least one indication; and
  employing the determined enclave in establishing a security association with the other host computing device.

14. The computer-readable memory of claim 13, wherein the operations further comprise:
  selecting a key based at least on the determined enclave; and
  establishing a security association with the other host commuting device using the selected key.

15. The computer-readable memory of claim 14, wherein selecting the key includes:
  selecting a server key from a set of server keys, where each server key of the set of server keys was derived from a different pair-wise enclave key of a set of pair-wise enclave keys.

16. The computer-readable memory of claim 13, wherein the operations further comprise:
  determining an enclave to which the other host computing device belongs based at least upon the at least one indication; and
  selecting a key based at least on the determined enclave to which the host computing device belongs and on the the determined enclave to which the other host computing device belongs.

17. The computer-readable memory of claim 16, wherein the operations further comprise:
  generating a security association key based at least on the selected server key and key derivation information.

18. The computer-readable memory of claim 17, wherein the key derivation information includes an identifier of a server device that generated the selected key and a security parameter index (SPI) that indicates how to generate the security association key from the selected key.

19. The computer-readable memory of claim 13, wherein the first packet is an Internet Key Exchange (IKE) or an AuthIP control packet.

20. The computer-readable memory of claim 13, wherein the at least one indication includes a chain of multiple indications inserted into the second packet by devices between the host computing device and the other computing device.

* * * * *